US008322367B2

(12) United States Patent
Harris et al.

(10) Patent No.: US 8,322,367 B2
(45) Date of Patent: Dec. 4, 2012

(54) CHEMICAL DELIVERY SYSTEM

(75) Inventors: Jaime L. Harris, Rosemount, MN (US);
Gary A. Brown, Faribault, MN (US);
David G. Kensinger, Richfield, MN (US); Karl J. Fritze, Hastings, MN (US)

(73) Assignee: Hydra-Flex Inc., Burnsville, MN (US)

( * ) Notice: Subject to any disclaimer, the term of this patent is extended or adjusted under 35 U.S.C. 154(b) by 952 days.

(21) Appl. No.: 12/246,317

(22) Filed: Oct. 6, 2008

(65) Prior Publication Data
US 2009/0090415 A1 Apr. 9, 2009

Related U.S. Application Data

(60) Provisional application No. 60/998,021, filed on Oct. 5, 2007.

(51) Int. Cl.
F16K 11/20 (2006.01)
F16K 1/00 (2006.01)
F16K 11/22 (2006.01)
F16K 11/00 (2006.01)
F16K 43/00 (2006.01)
F16K 51/00 (2006.01)
F15B 13/00 (2006.01)
F16L 55/18 (2006.01)

(52) U.S. Cl. .... 137/597; 137/883; 137/884; 137/315.09
(58) Field of Classification Search .......... 137/883, 137/597, 315.09, 315.27, 269, 884, 892; 264/DIG. 76
See application file for complete search history.

(56) References Cited

U.S. PATENT DOCUMENTS

| | | | |
|---|---|---|---|
| 3,788,344 A | 1/1974 | Dyck | |
| 4,691,850 A * | 9/1987 | Kirschmann et al. | 222/642 |
| 4,781,467 A | 11/1988 | Williams | |
| 4,848,391 A | 7/1989 | Miller et al. | |
| 5,050,631 A | 9/1991 | Konno et al. | |

(Continued)

FOREIGN PATENT DOCUMENTS
JP 2004000878 A 1/2004

OTHER PUBLICATIONS
Zurn QickPort® Manifold Brochure, 2007, 2 pages.

*Primary Examiner* — Dinh Q Nguyen
*Assistant Examiner* — Chee-Chong Lee
(74) *Attorney, Agent, or Firm* — Patterson Thuente Christensen Pedersen, P.A.

(57) ABSTRACT

An expandable chemical delivery system sharing a common bulk fluid inlet and bulk fluid flow path to direct a bulk fluid through one or more selected chemical eductors. Each chemical eductor is slidably insertable into an eductor port on the manifold body such that rotation of the chemical eductor is not required for installation. After installation, the orientation of the chemical eductor can be rotatably adjusted so as to avoid interference with adjacent chemical eductors. Delivery of a bulk fluid to each chemical eductor is controlled via a corresponding valve assembly that selectively allows or blocks flow of the bulk fluid from the bulk fluid flow path to the corresponding chemical eductor. The manifold body can include a plurality of individual manifold bodies approximated with a coupling system to define the bulk fluid flow path. Alternatively, the manifold body can comprise a single fabricated body for high pressure operation.

9 Claims, 27 Drawing Sheets

U.S. PATENT DOCUMENTS

| | | | |
|---|---|---|---|
| 5,435,157 A * | 7/1995 | Laughlin | 68/17 R |
| D368,298 S | 3/1996 | Miller et al. | |
| 5,607,651 A * | 3/1997 | Thomas et al. | 422/266 |
| 5,927,337 A * | 7/1999 | LaMantia | 137/883 |
| 6,240,953 B1 * | 6/2001 | Laughlin et al. | 137/268 |
| 6,322,242 B1 | 11/2001 | Lang et al. | |
| 6,619,318 B2 * | 9/2003 | Dalhart et al. | 137/565.34 |
| 6,733,044 B2 * | 5/2004 | Huang | 285/124.1 |
| 7,111,644 B2 | 9/2006 | Rehder et al. | |
| 2006/0157131 A1 * | 7/2006 | Harris et al. | 137/889 |

* cited by examiner

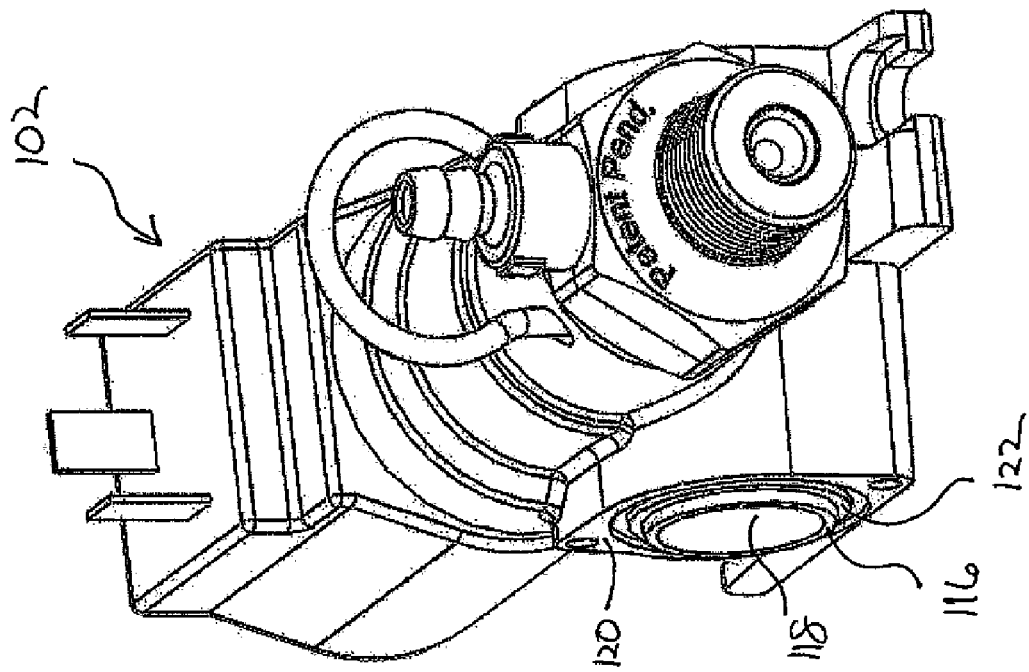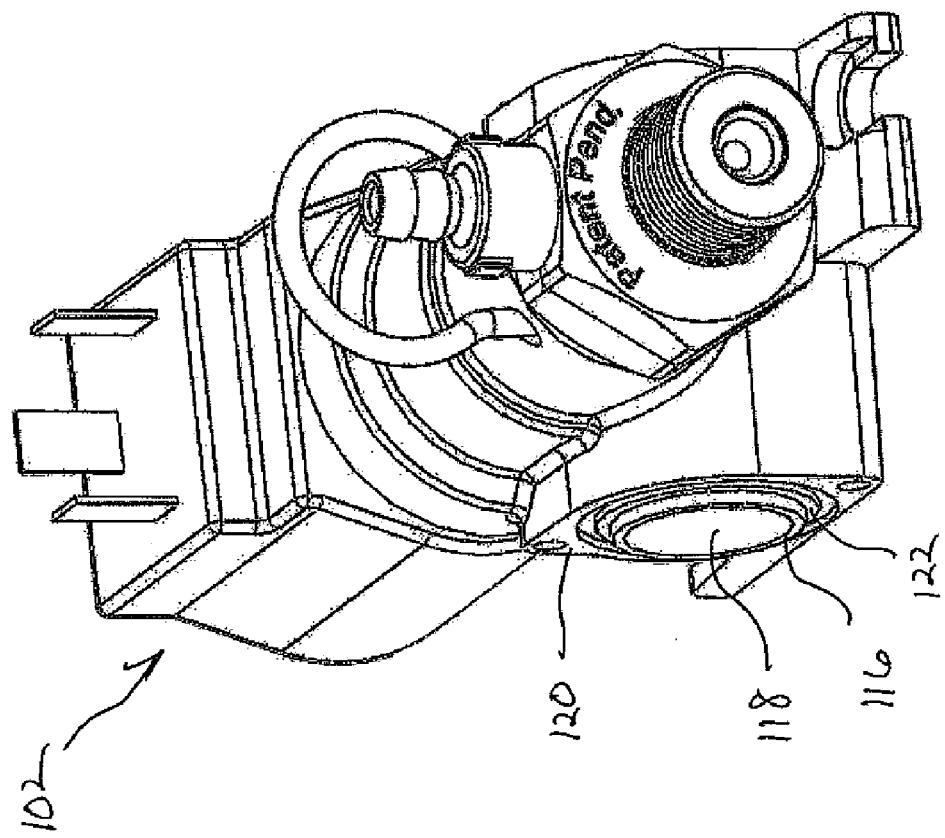
FIG. 18

CHEMICAL DELIVERY SYSTEM

PRIORITY CLAIM

The present application claims priority to U.S. Provisional Application Ser. No. 60/998,021, filed Oct. 5, 2007 and entitled, "CHEMICAL DELIVERY SYSTEM", which is hereby incorporated by reference.

FIELD OF THE INVENTION

The present invention relates generally to chemical dispensing systems. More specifically, the present invention is directed to a dispensing system having a common, expandable manifold that supplies a bulk fluid to a plurality of chemical eductors attached to the manifold.

BACKGROUND OF THE INVENTION

Water is often used as a bulk fluid to transport various chemicals which are intended to be used in a dilution ratio. Since it is often inconvenient or expensive to transport and store chemical solutions at their intended working concentrations, various methods have been devolved to mix concentrated chemicals into a flow stream of other fluids. Metering pumps, batch tanks, spraying of concentrated chemicals are all typical methods currently in use today. Feeding chemicals by using a venturi is also very common.

In this chemical dilution, mixing and delivery method, a particular orifice is chosen to create a low-pressure region. In this low-pressure region, a port is adapted to allow another feed of fluid to be drawn into the main flow stream. It is under this low pressure that concentrated chemicals can be metered in using a partial vacuum. As long as there is a suitable difference in the inlet and outlet pressures, these venturi-based chemical delivery systems are simple, reliable and work very well.

Currently in the marketplace, similar eductors/injectors are hard plumbed or directly threaded into manifold blocks using traditional *National Pipe Thread Tapered Thread* (NPT) threads. This can be difficult to deal with in the field when additional plumbing or piping is attached or the injector arrangement is reconfigured. Typical eductors have an operational life of 1-3 years at which point they typically need to be replaced.

Pipe threads are commonly understood to be a permanent method of connecting pipe sections and fittings. While it is possible to remove a pipe thread joint and reassemble it, it generally requires tools and significant maintenance time. Depending upon the fluids and operational environments, oftentimes the mating threads will deteriorate with use. Also, pipe thread connections can be prone to leaking unless large forces are used to tighten and eliminate any gaps. In many instances, connection sealants such as Teflon tape can be used to seal pipe thread connections but this method can facilitate very high hoop-stresses in the pipe fittings, which can result in splitting within the metal or plastic fittings during assembly or alternatively, lead to fatigue cracking over time. The reason this is common is that Teflon is a very friction-free material and will allow much higher hoop-stress to be attained relative to torque. Also, Teflon tape builds thickness and can add to the effective diameter leading to additional hoop-stress. Finally, the use of Teflon tape or can result in fouling of precision orifices, valves and other critical components by the release of small shards of debris. While other conventional thread sealants may overcome many of the disadvantages of using Teflon tape with pipe threads, these pastes and liquids can be messy and tend to harden over time which can make joint disassembly almost impossible.

While the aforementioned difficulties of conventional pipe and tubing connections can lead to increased expense in maintaining conventional piping arrangements, these difficulties are even more pronounced within chemical injection systems that utilize a manifold to inject a plurality of distinct chemicals into a fluid stream.

SUMMARY OF THE INVENTION

In order to address the limitations described above, a representative expandable chemical delivery system allows for individual chemical eductors to be operably connected to a fluid manifold without requiring any threading of the eductor and without disassembly of any other eductor currently, operably connected to the fluid manifold. This allows the down stream piping and plumbing to be installed to the eductor prior to placing the inlet connection into the manifold. Replacement in the field is simplified considerably. This new architecture is easier to remove and install by just removing locking and/or shear pins. In some embodiments, a shared manifold body can provide integrity to the connection architecture of representative expandable chemical delivery systems so as to allow for operation in excess of 1000 psi.

Each eductor member can be individually operated by selectively actuating a corresponding valve assembly. In this manner, the plurality of individual eductor members can be supplied via a single common bulk fluid stream at the direction of multiple valve assemblies. In addition, representative embodiments of expandable chemical delivery systems can utilize a manifold body having easy push-to-connect/lockable interfaces for its replaceable components allowing the manifold body to be selectively configured without disassembling existing connections including associated upstream or downstream piping or tubing connections. In one representative embodiment, an expandable chemical delivery system can be used in vehicle washing applications or in other suitable fluid handling applications wherein a plurality of eductors are used to introduce different chemicals or liquids using a shared bulk fluid. The manifold body has a common bulk fluid inlet that feeds all eductors attached to the manifold.

In one aspect of the present disclosure, expandable chemical delivery systems provide for a compact manifold system that avoids the use of excess space. Through the use of quick-connect type fittings, the expandable chemical delivery system allows for easy configuration, installation, maintenance and repair without requiring additional clearance or work space for disassembly and the use of tools.

In another aspect of the disclosure, an expandable chemical delivery system can have a smaller manifold footprint by providing for a plurality of selectively operable chemical eductors that are placed in close proximity to one another. Through the use of quick-connect fittings to couple the chemical eductors to a manifold body, the rotation and disassembly space needed with conventional distribution manifolds is avoided. Generally, connections can be made to the manifold body by pushing the component into an eductor port on the manifold body without any rotation of the eductor member. Once the eductor member is operably connected to the eductor port, the eductor member can be rotated to allow for physical adjustment of eductor orientation without compromising the seal or joint integrity. In addition, the connections can include a locking member such as, for example, a spring/loaded clip or shear pin, that prevents disassembly of the quick-connect connection without the express intent and physical intervention of the operator who must generally release the locking feature in order to disconnect the component.

In another aspect of the disclosure, an expandable chemical delivery system can comprise a plurality of individual manifold bodies that are coupled together with a coupling system so as to define a common bulk fluid flow path having a shared bulk fluid inlet. Each manifold body can further include a valve assembly and eductor assembly such that administration of a chemical through a particular eductor assembly is controlled through actuation of the corresponding valve assembly. By defining a common bulk fluid flow path, overall size of the expandable chemical delivery system is reduced and plumbing/tubing connections are reduced.

In another aspect of the disclosure, a high-pressure expandable chemical delivery system can comprise a common manifold body with a plurality of eductor members and a plurality of valve assemblies. The common manifold body can include a single bulk fluid inlet supplying a bulk fluid conduit and a plurality of eductor conduits in fluid communication with the bulk fluid conduit. Each eductor conduit is fluidly connected to a valve port such that actuation of selected valve assemblies allows the bulk fluid to flow through the selected eductor conduit and to the selected eductor member. Representative embodiments of the common manifold body can assume a radial or linear orientation and in some instance, are operable at pressures up to 1000 psig.

The above summary of the invention is not intended to describe each illustrated embodiment or every implementation of the present invention. The figures and the detailed description that follow more particularly exemplify these embodiments.

BRIEF DESCRIPTION OF THE FIGURES

These as well as other objects and advantages of the disclosure, will be more completely understood and appreciated by referring to the following more detailed description of representative embodiments of the invention in conjunction with the accompanying drawings of which:

FIG. 18 is a perspective view of a first and second eductor assembly prior to being approximated to form the expandable chemical delivery system.

DETAILED DESCRIPTION OF THE FIGURES

Figure 1:
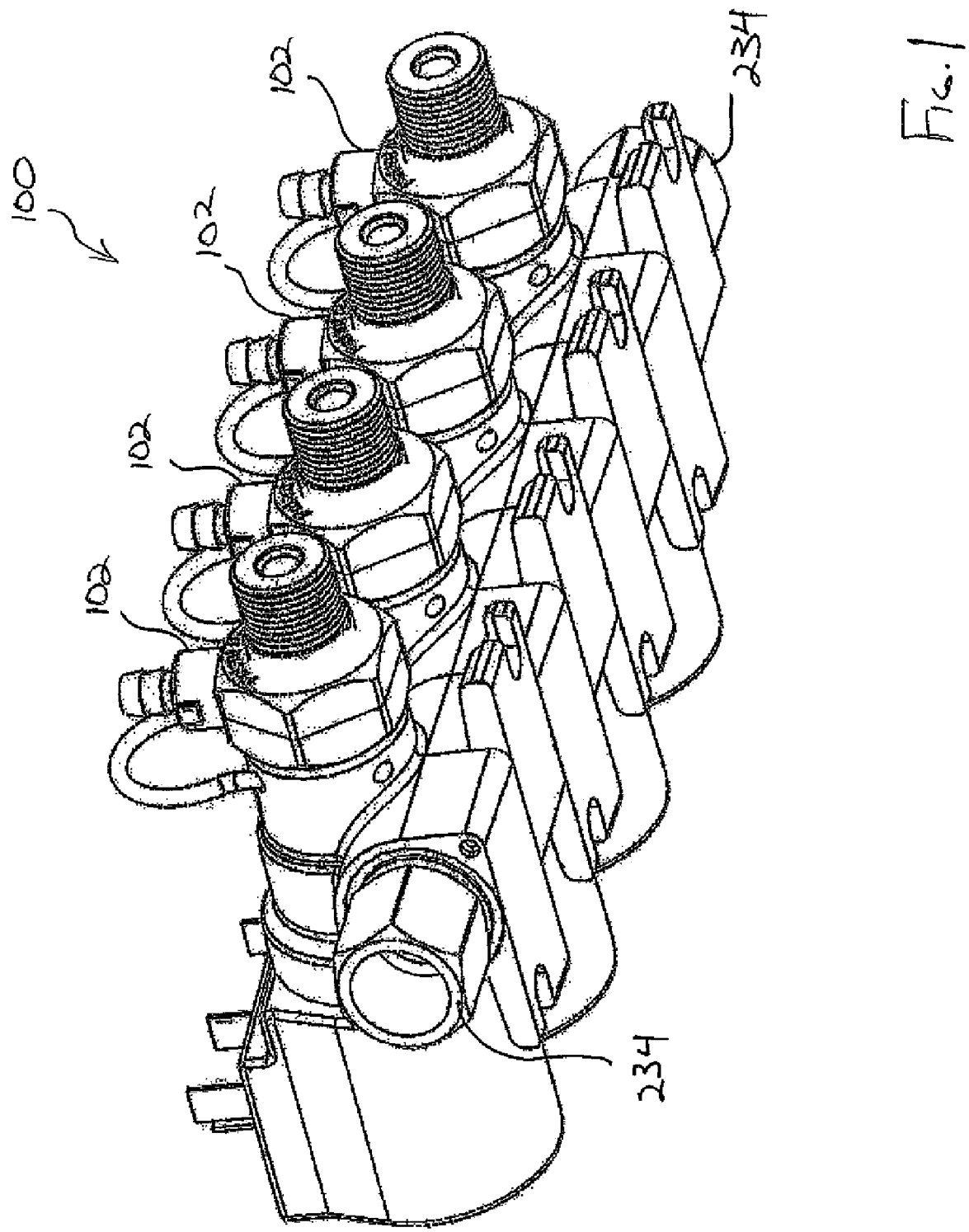
FIG. 1 is a perspective view of a representative embodiment of an expandable chemical delivery system according to the present invention.
Figure 2:
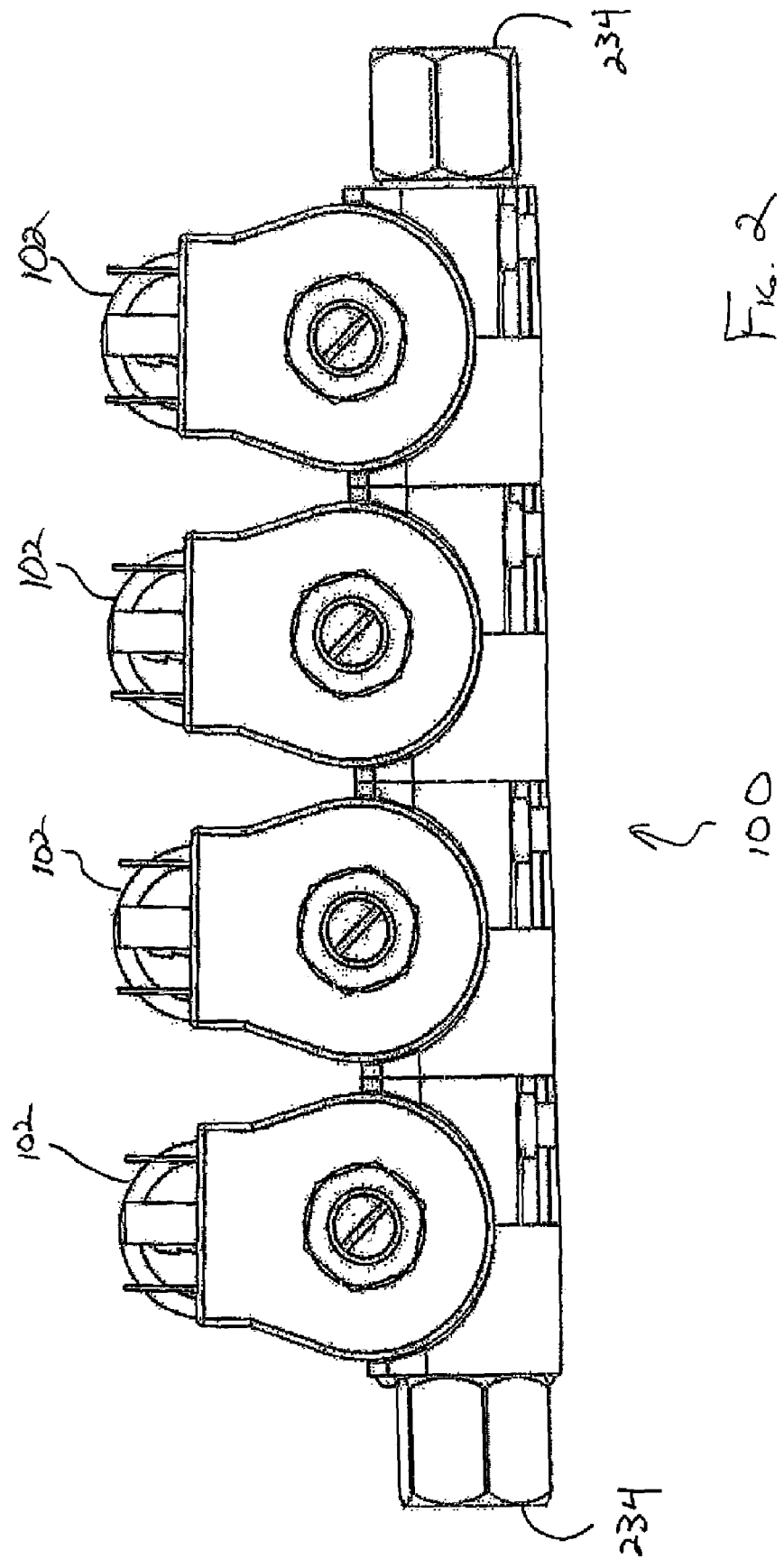
FIG. 2 is a rear view of the expandable chemical delivery system of FIG. 1.
Figure 3:
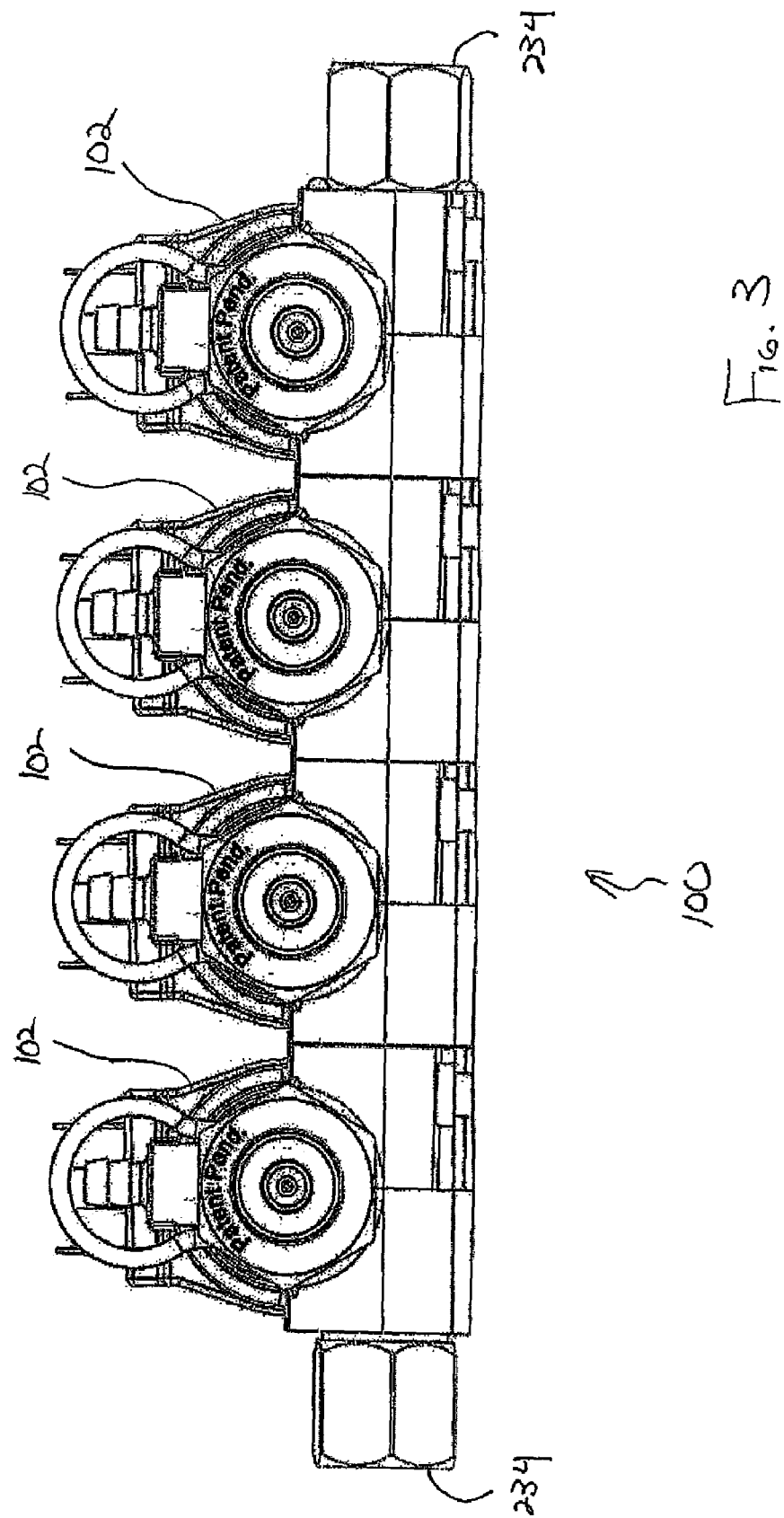
FIG. 3 is a front view of the expandable chemical delivery system of FIG. 1.
Figure 4:
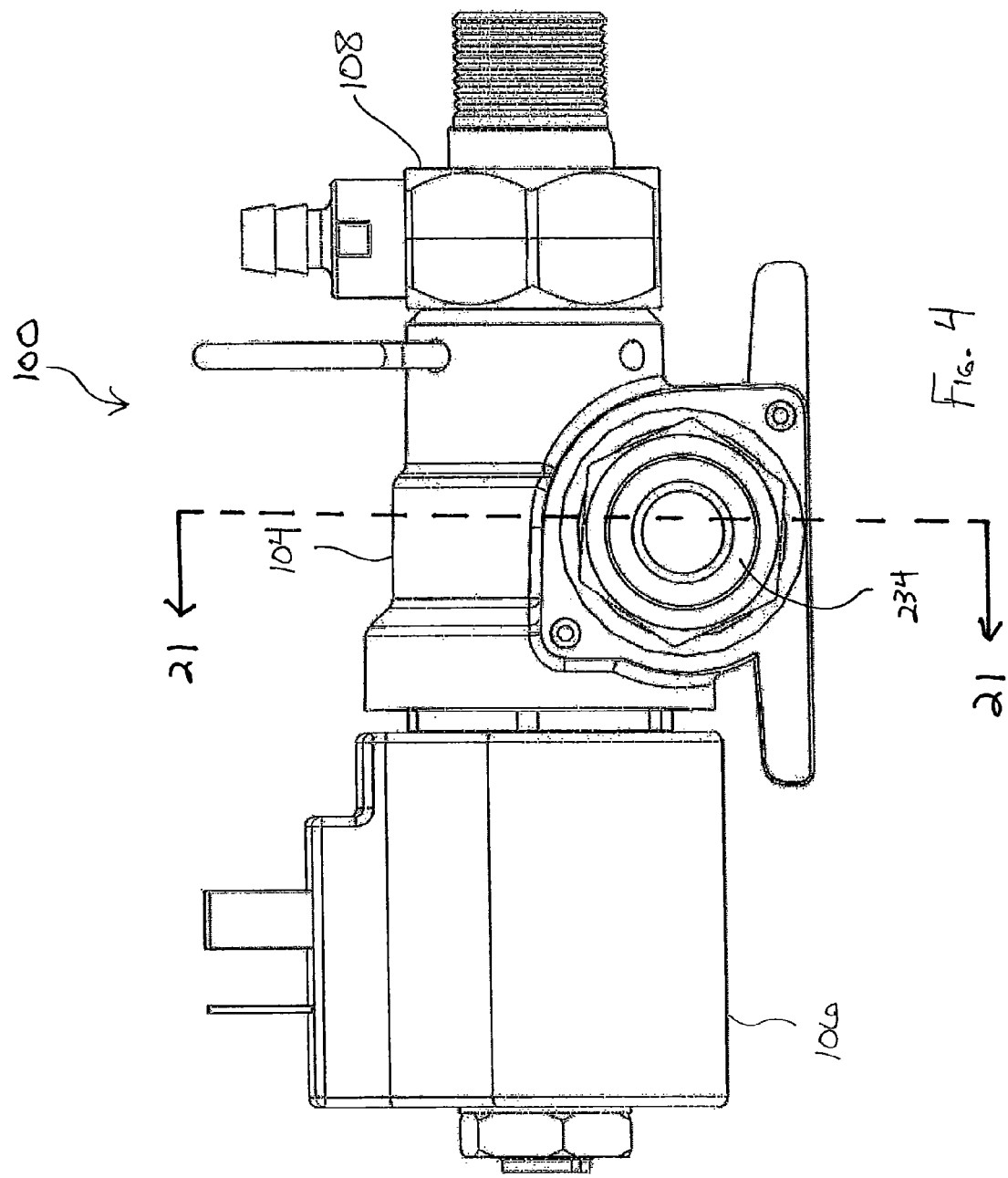
FIG. 4 is an end view of the expandable chemical delivery system of FIG. 1.
Figure 5:
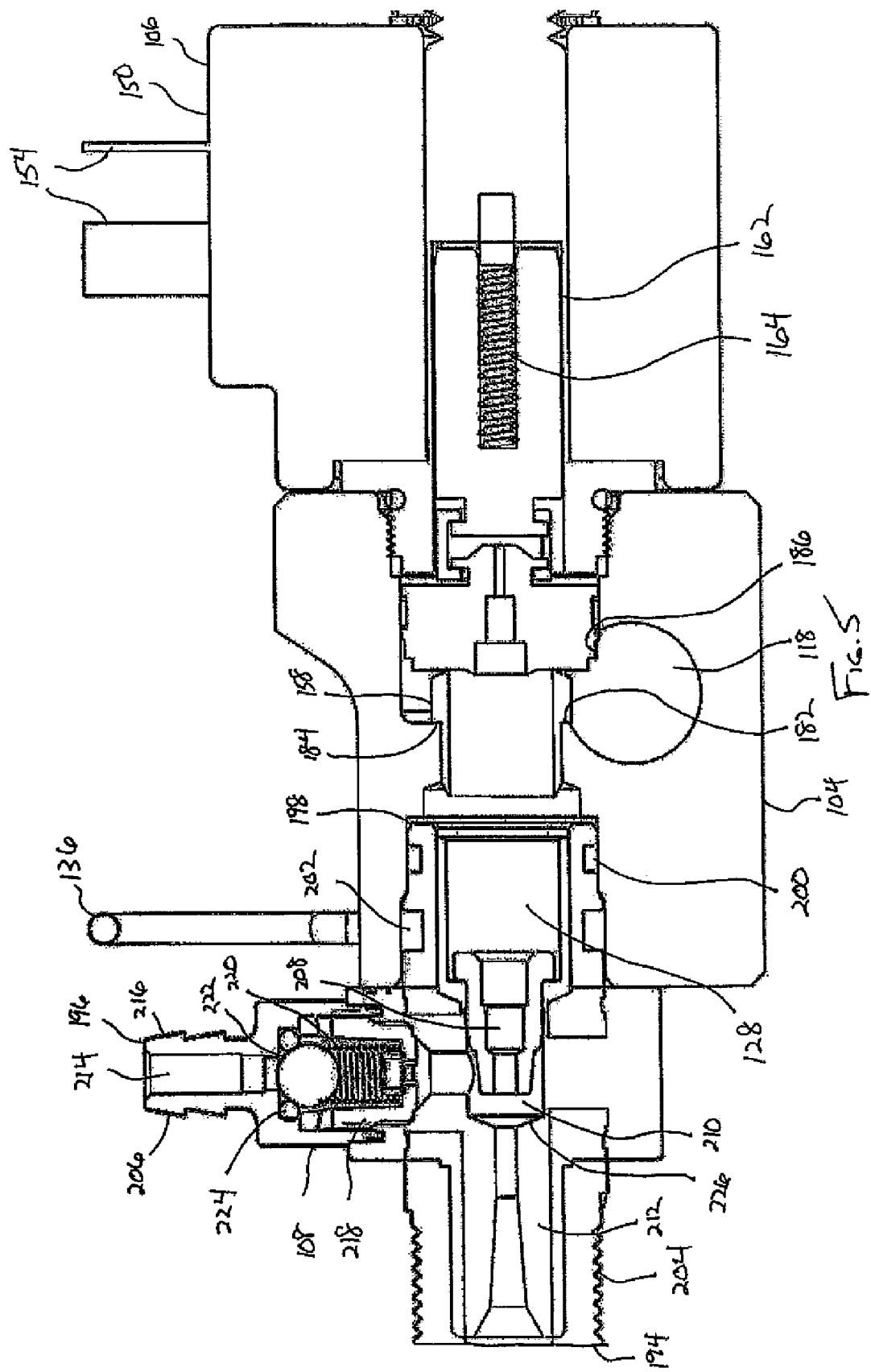
FIG. 5 is a section view of a representative embodiment of an eductor assembly according to the present invention.
Figure 6:
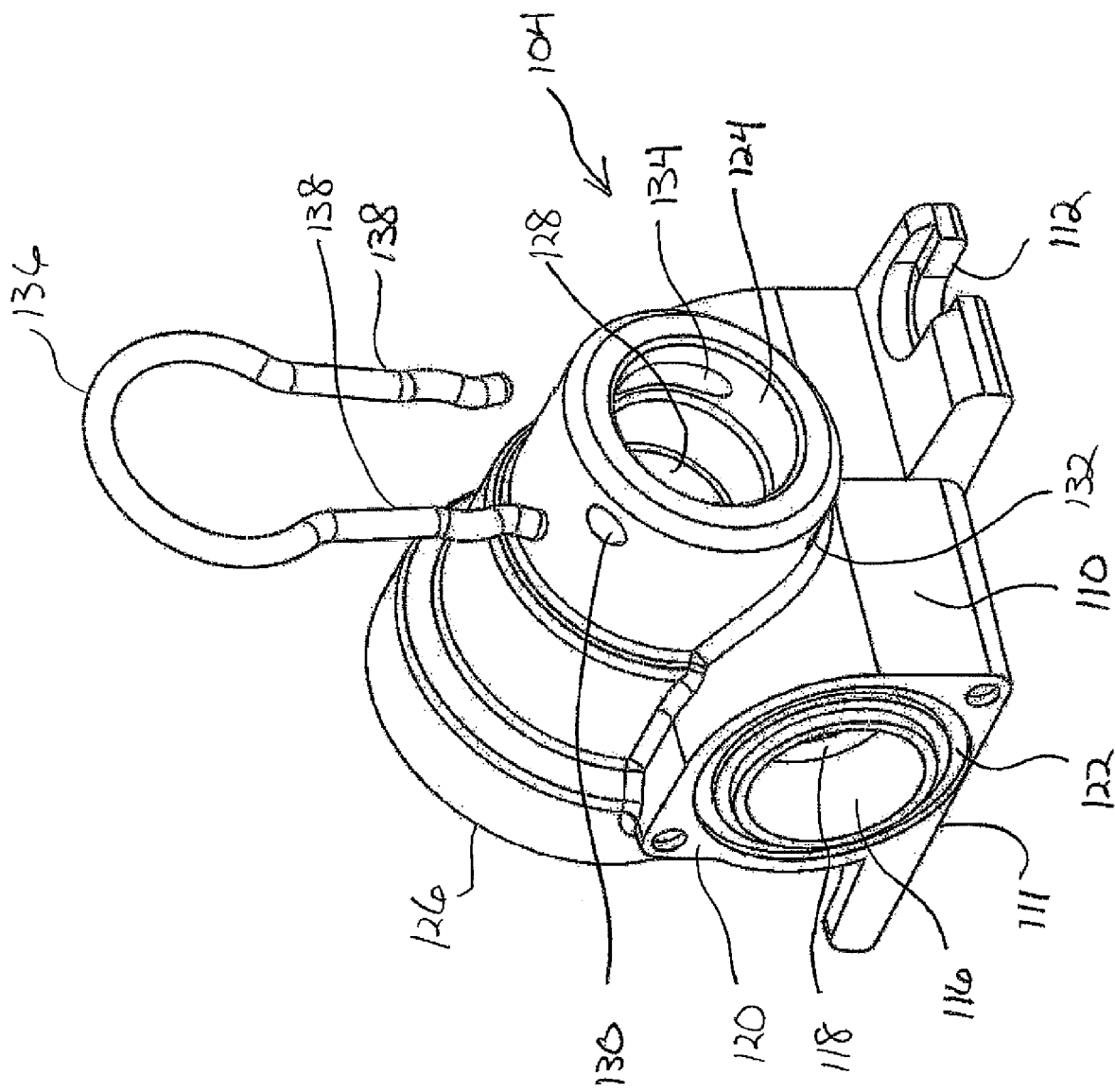
FIG. 6 is a perspective view of a representative embodiment of a manifold body according to the present invention.
Figure 7:
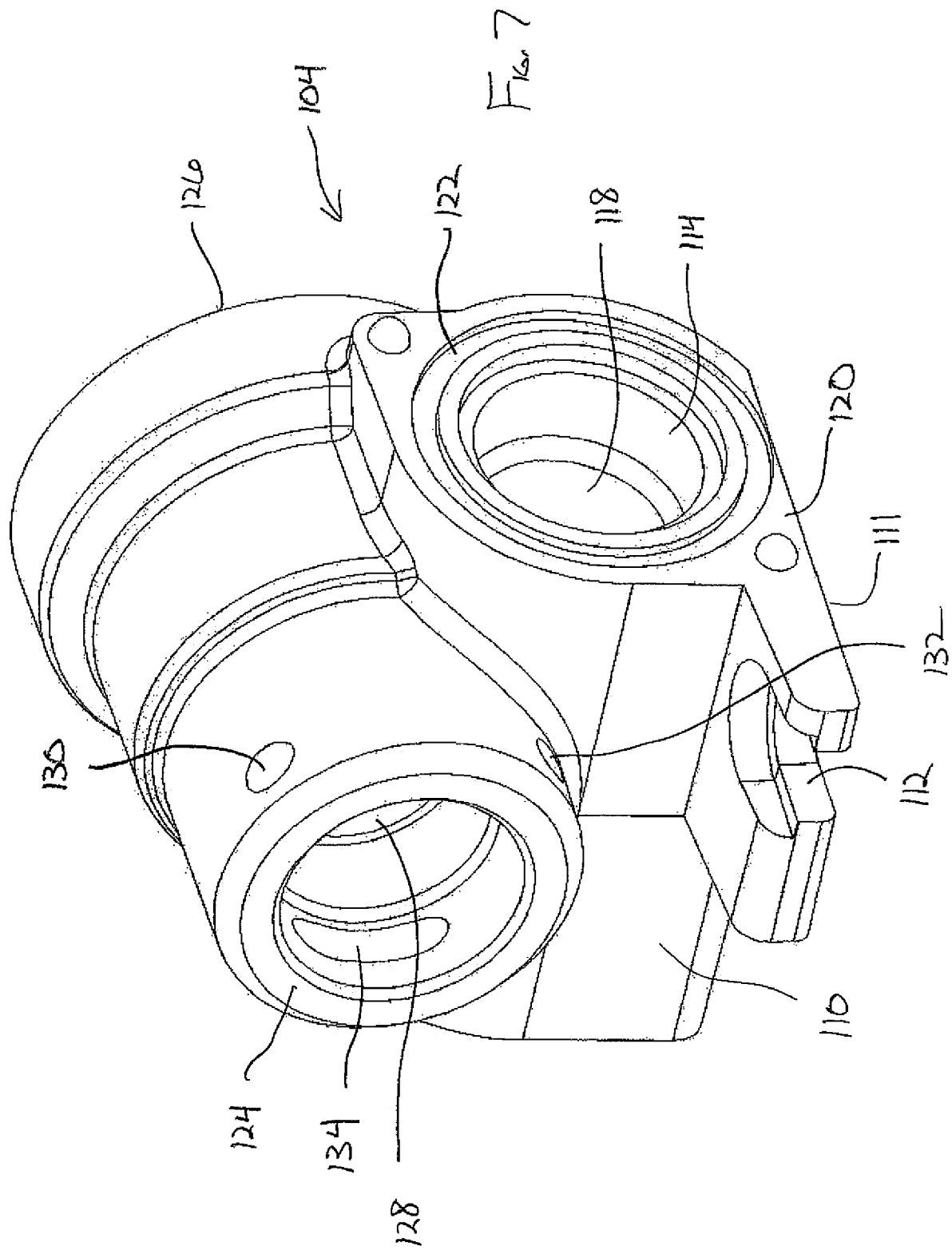
FIG. 7 is a perspective view of the manifold body of FIG. 6.
Figure 8:
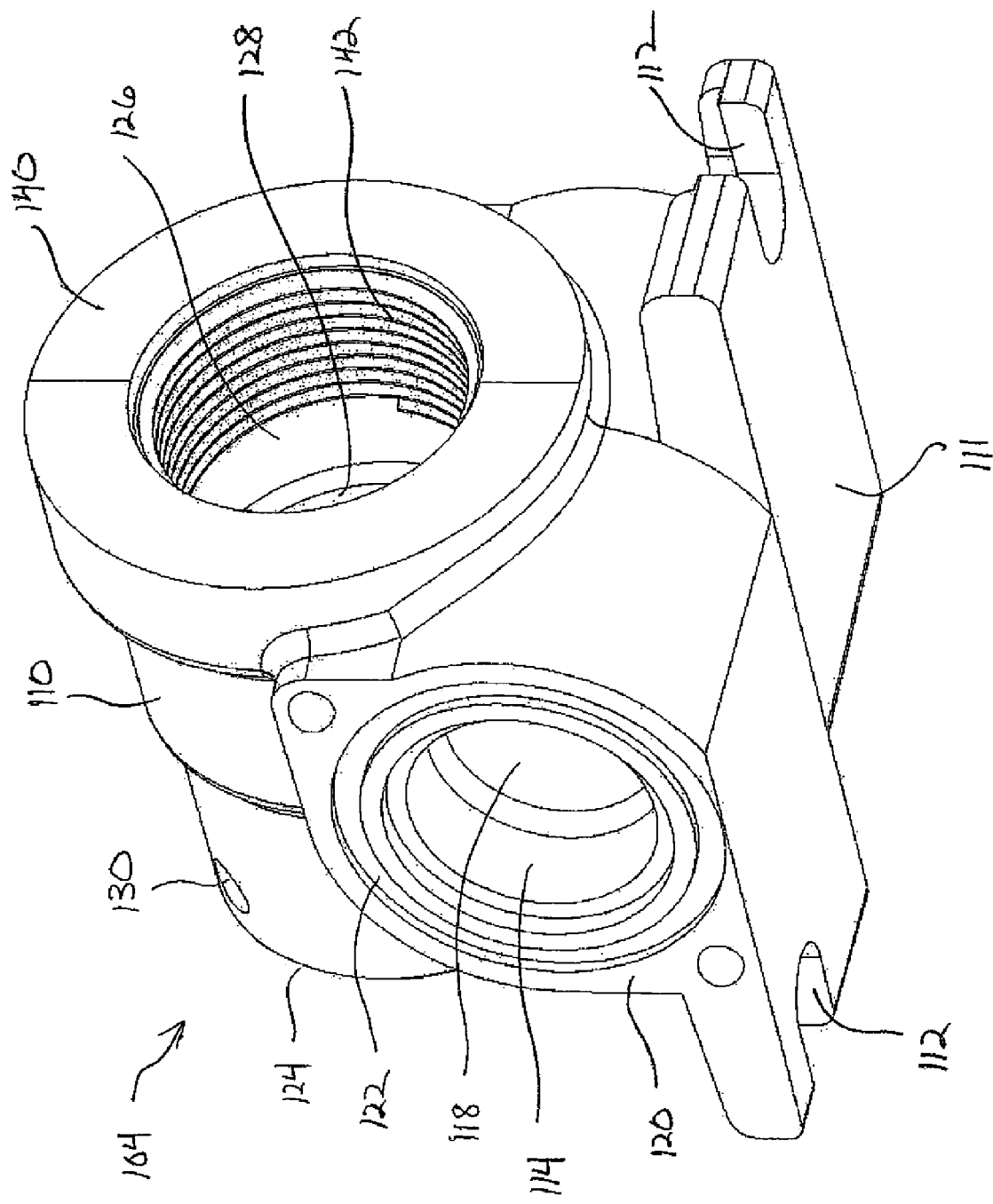
FIG. 8 is a perspective view of the manifold body of FIG. 6.
Figure 9:
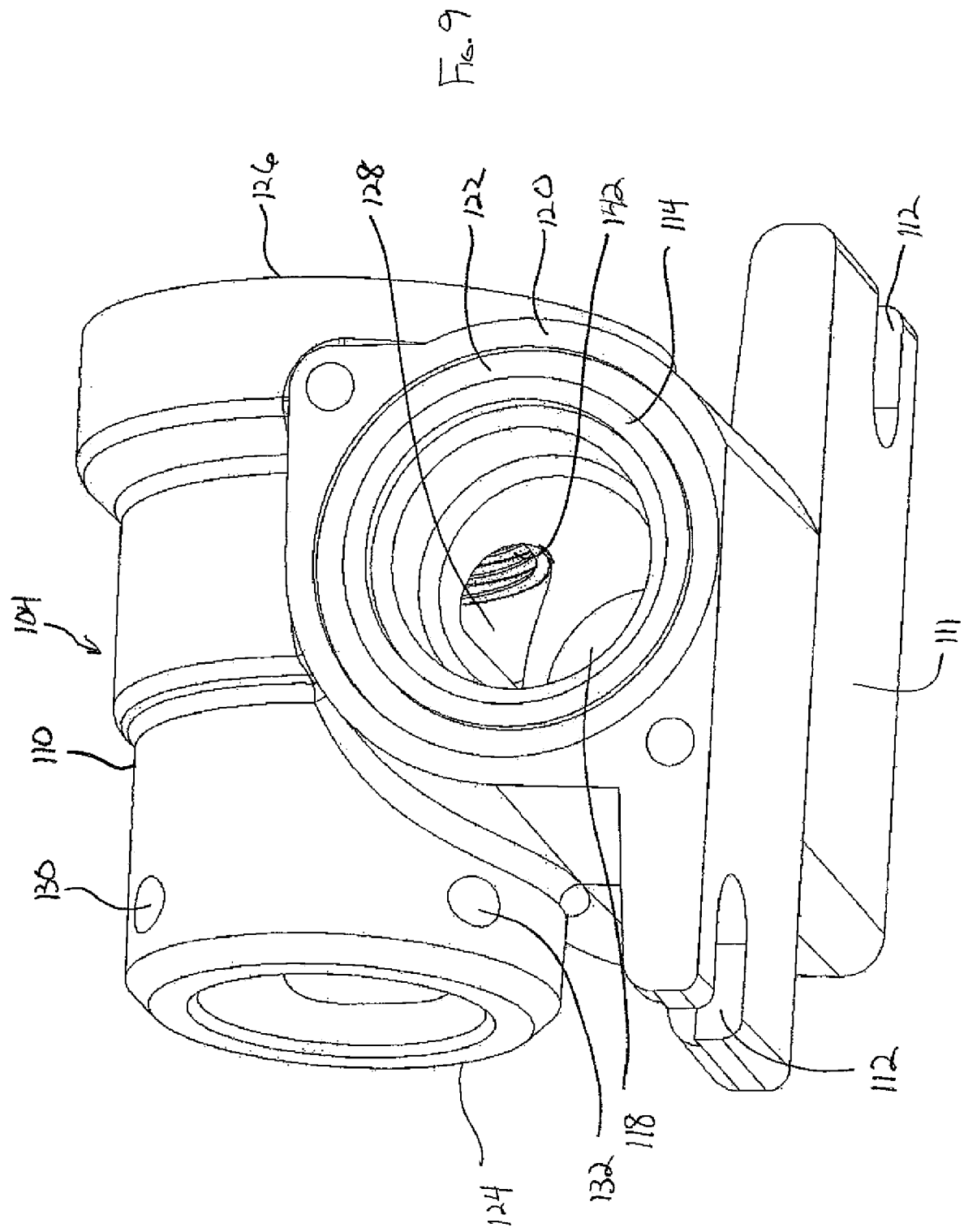
FIG. 9 is a perspective view of the manifold body of FIG. 6.

Referring now to FIGS. 1, 2 and 3, a representative expandable chemical delivery system 100 generally comprises a plurality of eductor assemblies 102. The plurality of eductor assemblies 102 are mechanically and fluidly interconnected such that expandable chemical delivery system 100 is capable of being positioned and mounted as an integral unit. As illustrated in FIGS. 1, 2 and 3, expandable chemical delivery system 100 can comprise four eductor assemblies 102 though it will be understood that expandable chemical delivery system 100 generally includes at least two eductor assemblies 102. As shown in FIGS. 4 and 5, each eductor assembly 102 generally comprises a manifold body 104, a valve assembly 106 and an eductor member 108.

Figure 10:
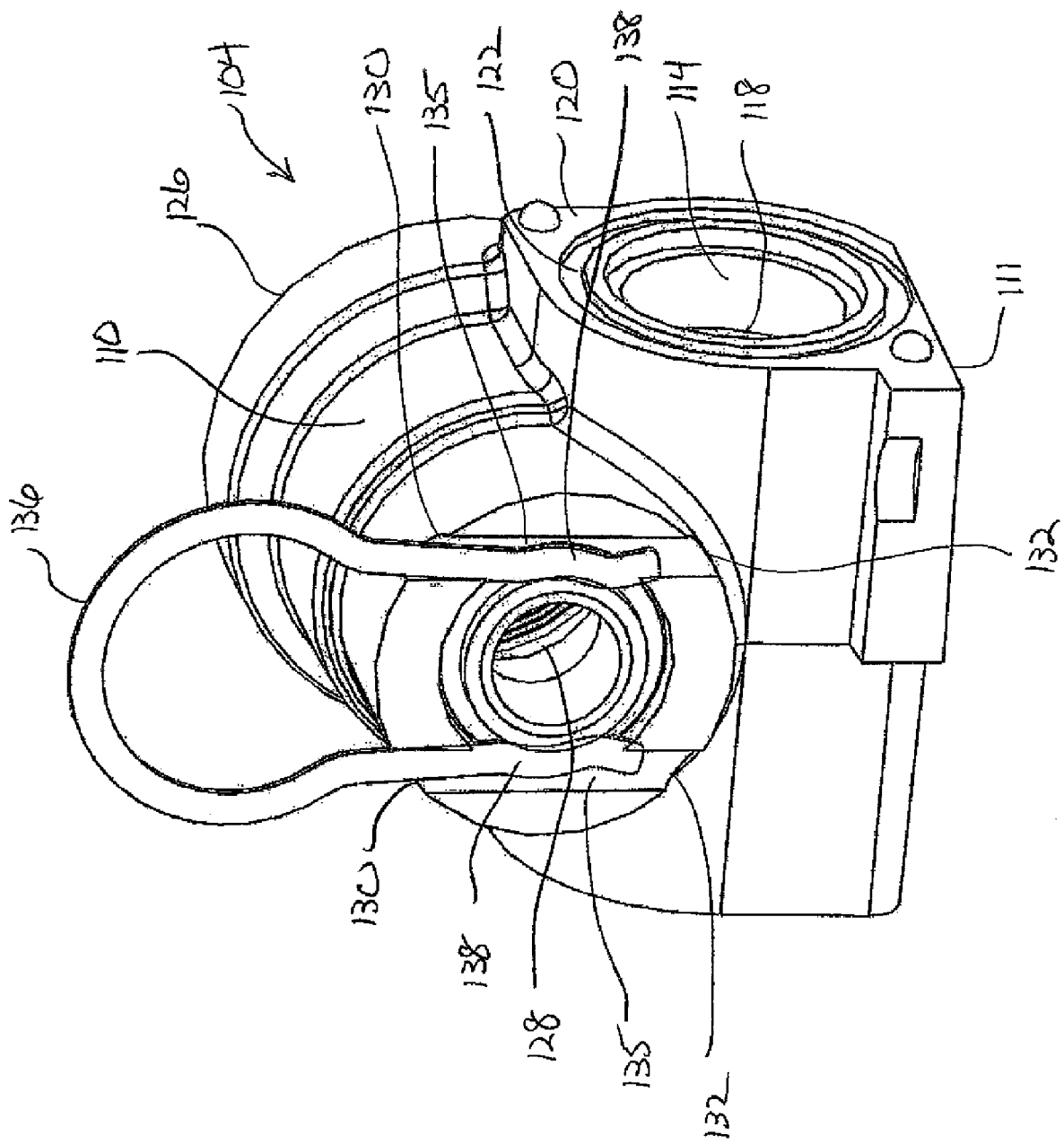
FIG. 10 is a perspective, partial section view of the manifold body of FIG. 6.

Manifold body 104 is illustrated generally in FIGS. 6, 7, 8 and 9. Manifold body 104 generally comprises a unitary molded body 110 having a substantially flat mounting surface 111 with two or more mounting holes 112. Manifold body 104 is preferably fabricated of a suitable polymeric material that combines the qualities of strength and chemical resistance such as, for example, acetal, nylon, polyphenyl sulfide and the like. Manifold body 104 includes a bulk fluid inlet 114 and an axially aligned bulk fluid outlet 116 that are fluidly interconnected with a bulk fluid flow path 118. Bulk fluid inlet 114 and bulk fluid outlet 116 have substantially similar configurations and generally include a mounting face 120 and a sealing groove 122. Manifold body 104 further comprises an eductor port 124 and an axially aligned valve port 126 that are fluidly interconnected by a dispensing fluid flow path 128. Bulk fluid flow path 118 and dispensing fluid flow path 128 are generally arranged transversely to one another and have substantially large enough diameters such that the bulk fluid flow path 118 and dispensing fluid flow path 128 are fluidly interconnected even though their respective flow axis reside on different planes within the manifold body 104. Eductor port 124 generally includes a pair of upper locking apertures 130 and a pair of lower locking apertures 132. Within the eductor port 124, a pair of locking grooves 134 reside between corresponding upper locking apertures 130 and lower locking apertures 132 such that a pair of continuous locking bores 135 connect corresponding upper locking apertures 130 and lower locking apertures 132 as shown in FIG. 10. A locking member 136 having a pair of insertion legs 138 is configured such that each leg 138 is simultaneously slidably insertable into corresponding upper locking aperture 130 and lower locking aperture 132 with a portion of legs 138 residing within locking groove 134. Valve port 126 generally includes a valve mounting face 140 and an internal port thread 142.

Figure 11:
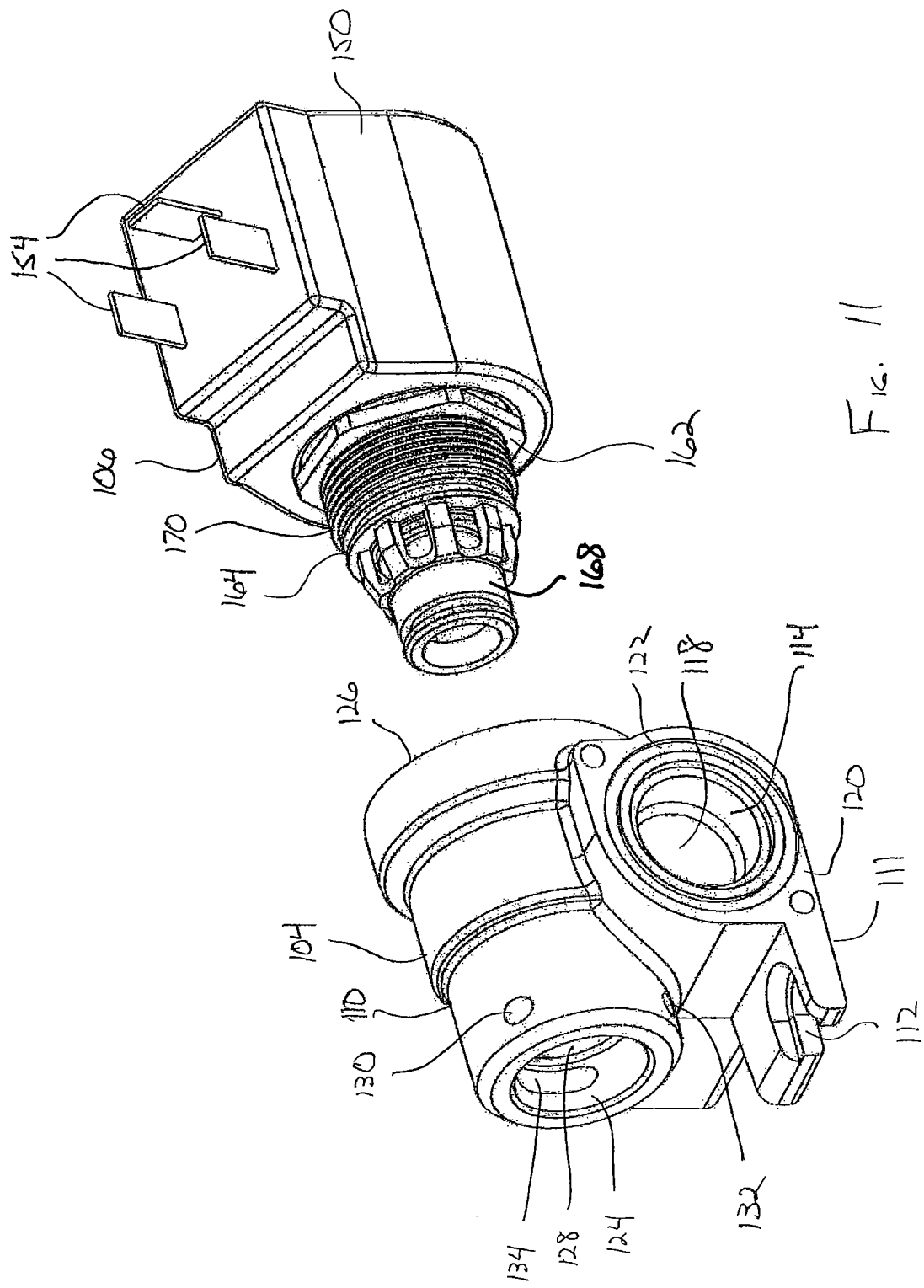
FIG. 11 is a perspective view of the manifold body of FIG. 6 prior to attachment to a representative embodiment of a valve assembly according to the present invention.
Figure 12:
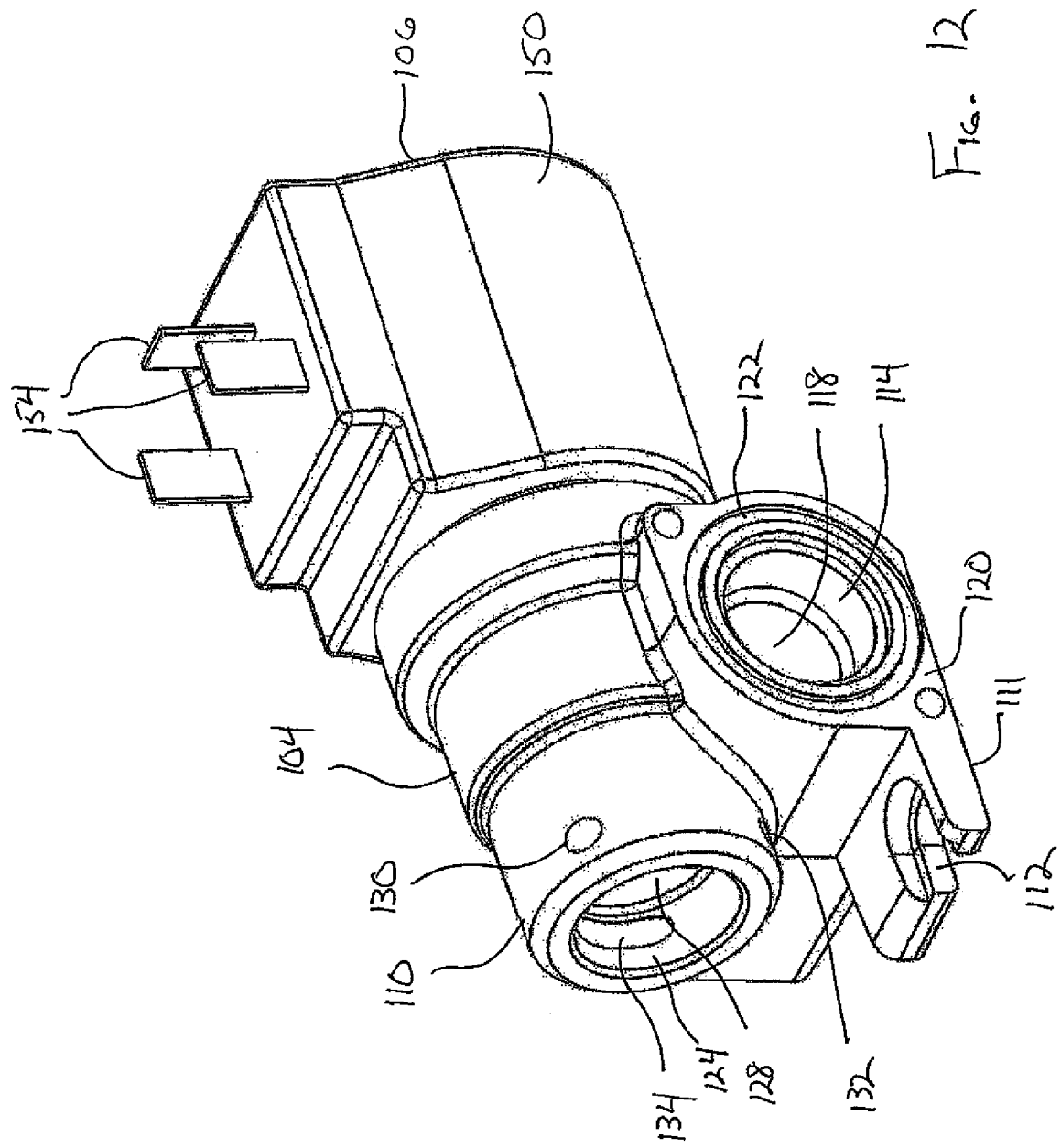
FIG. 12 is a perspective view of the coupled manifold body of FIG. 6 with the valve assembly of FIG. 11.
Figure 13:
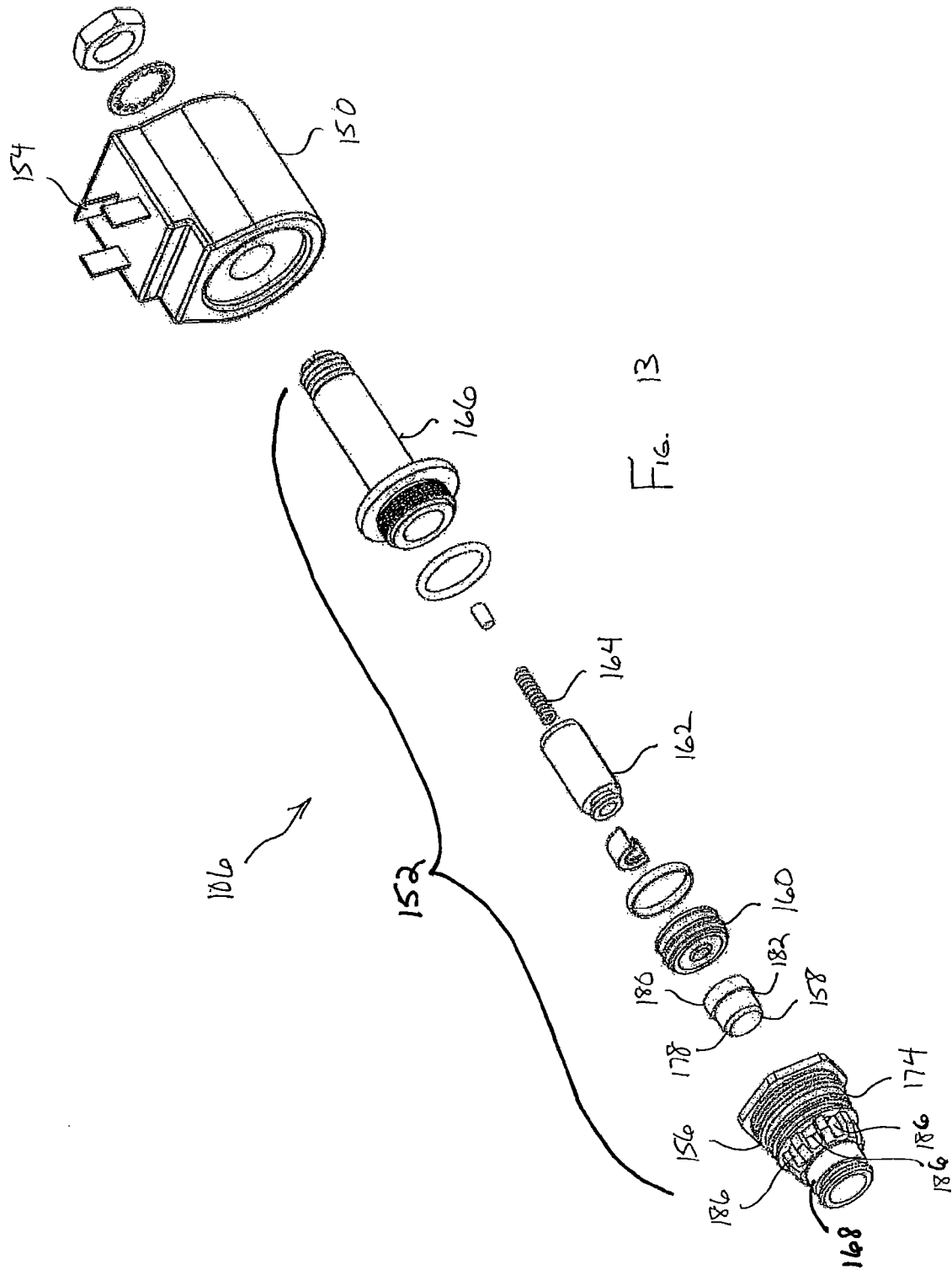
FIG. 13 is an exploded perspective view of the valve assembly.
Figure 14:
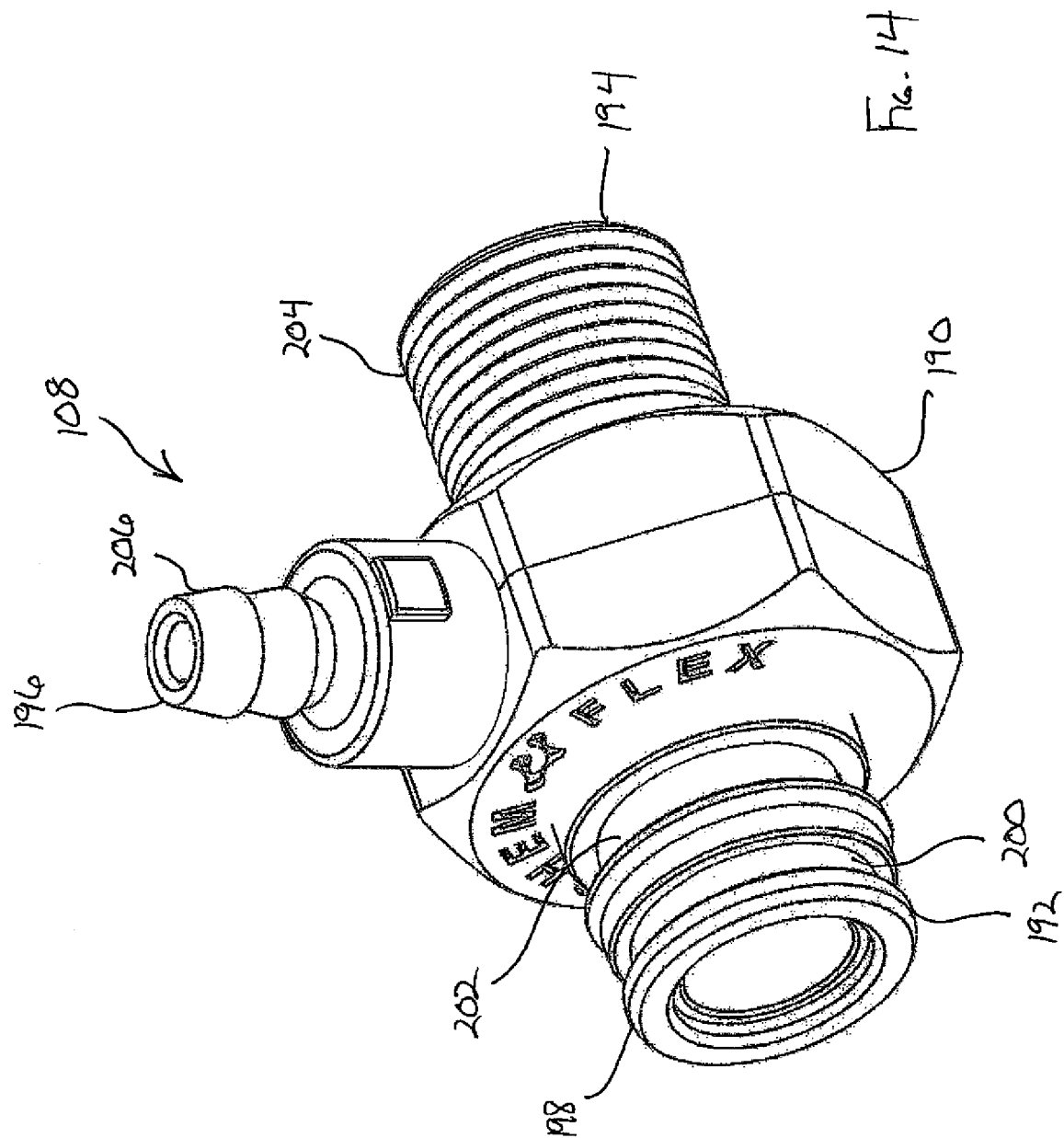
FIG. 14 is a perspective view of a representative embodiment of an eductor member according to the present invention.
Figure 15:
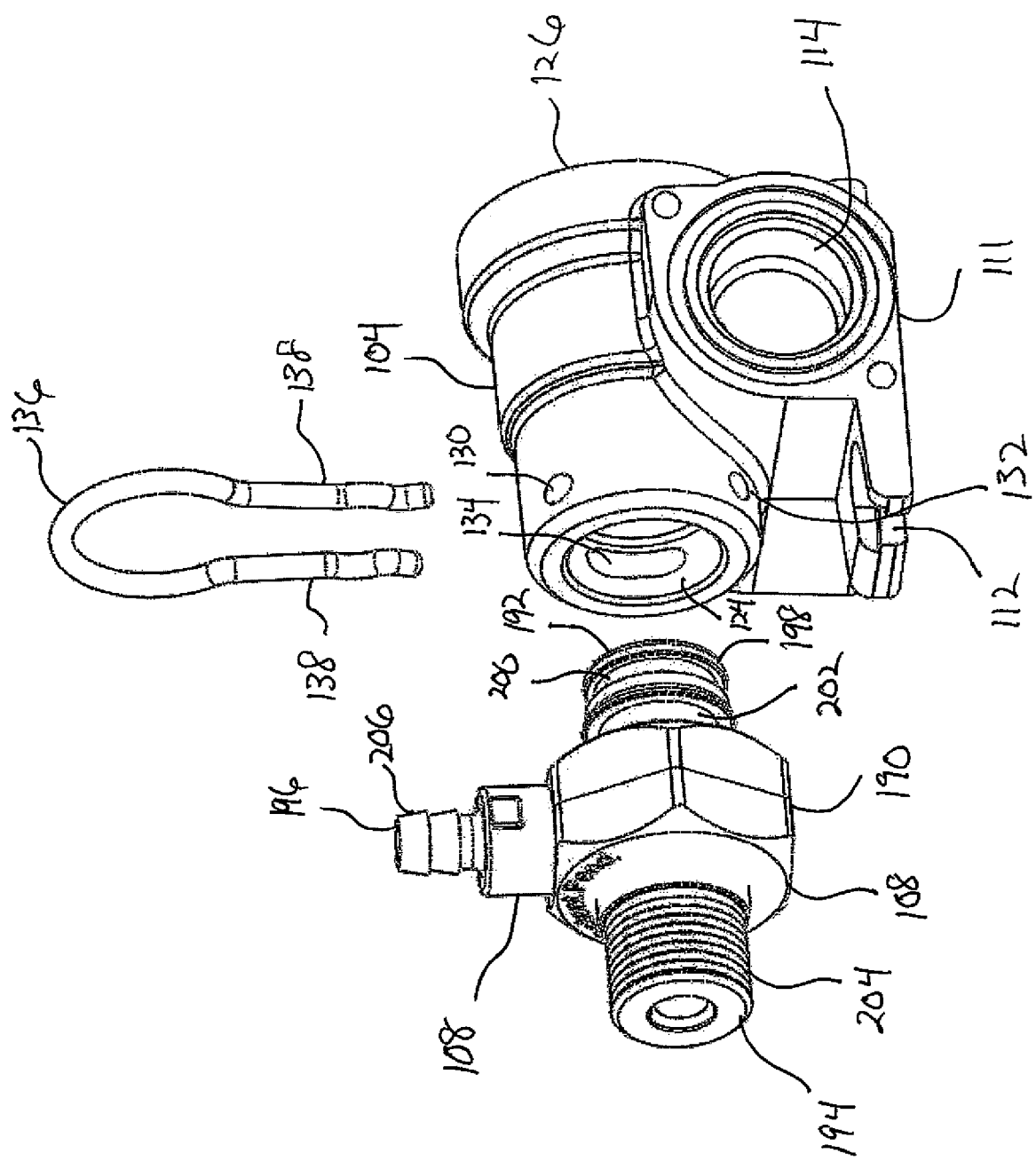
FIG. 15 is a perspective view of the manifold body of FIG. 6 prior to attachment to the eductor member of FIG. 14.
Figure 16:
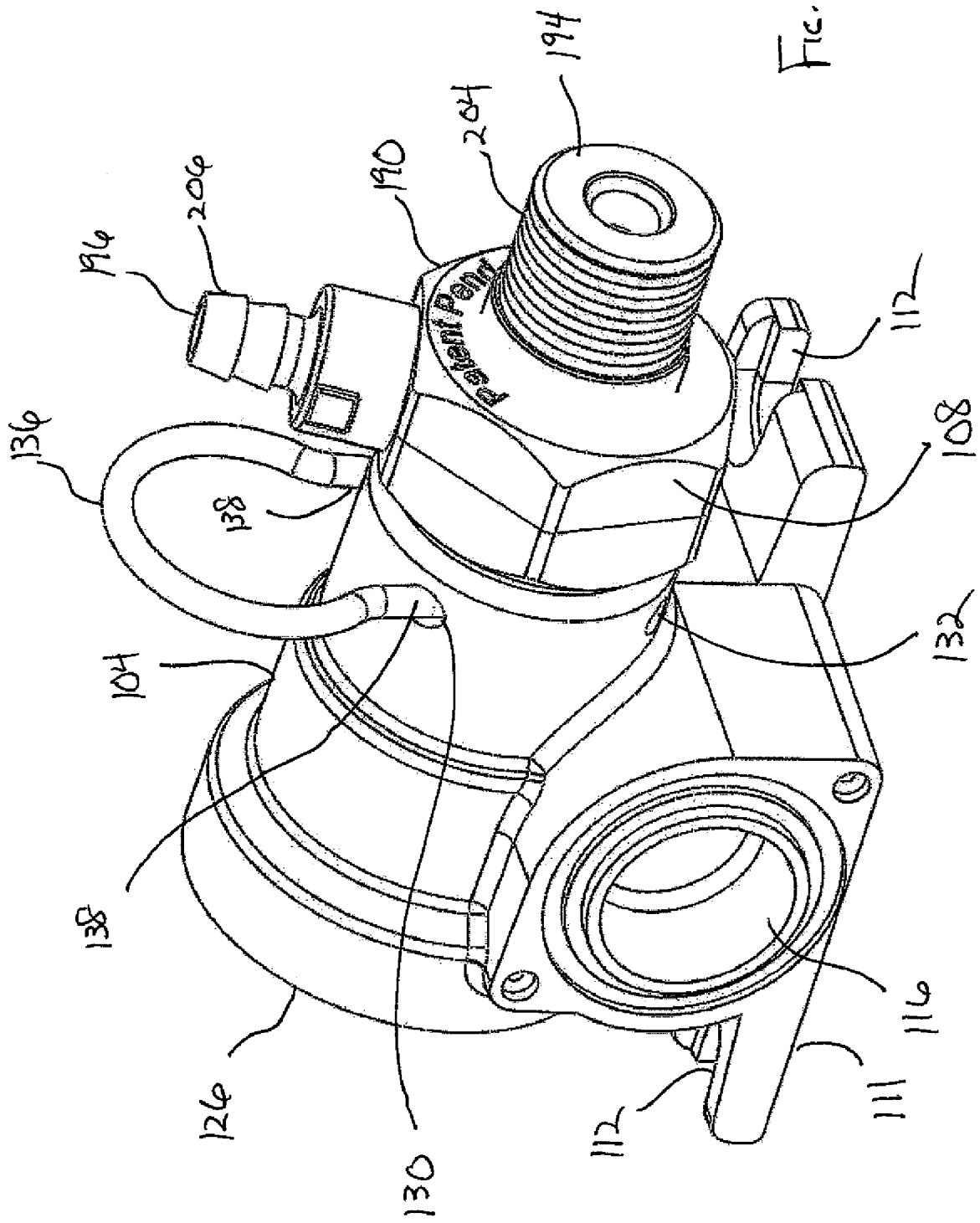
FIG. 16 is a perspective view of the coupled manifold body of FIG. 6 with the eductor member of FIG. 14.
Figure 17:
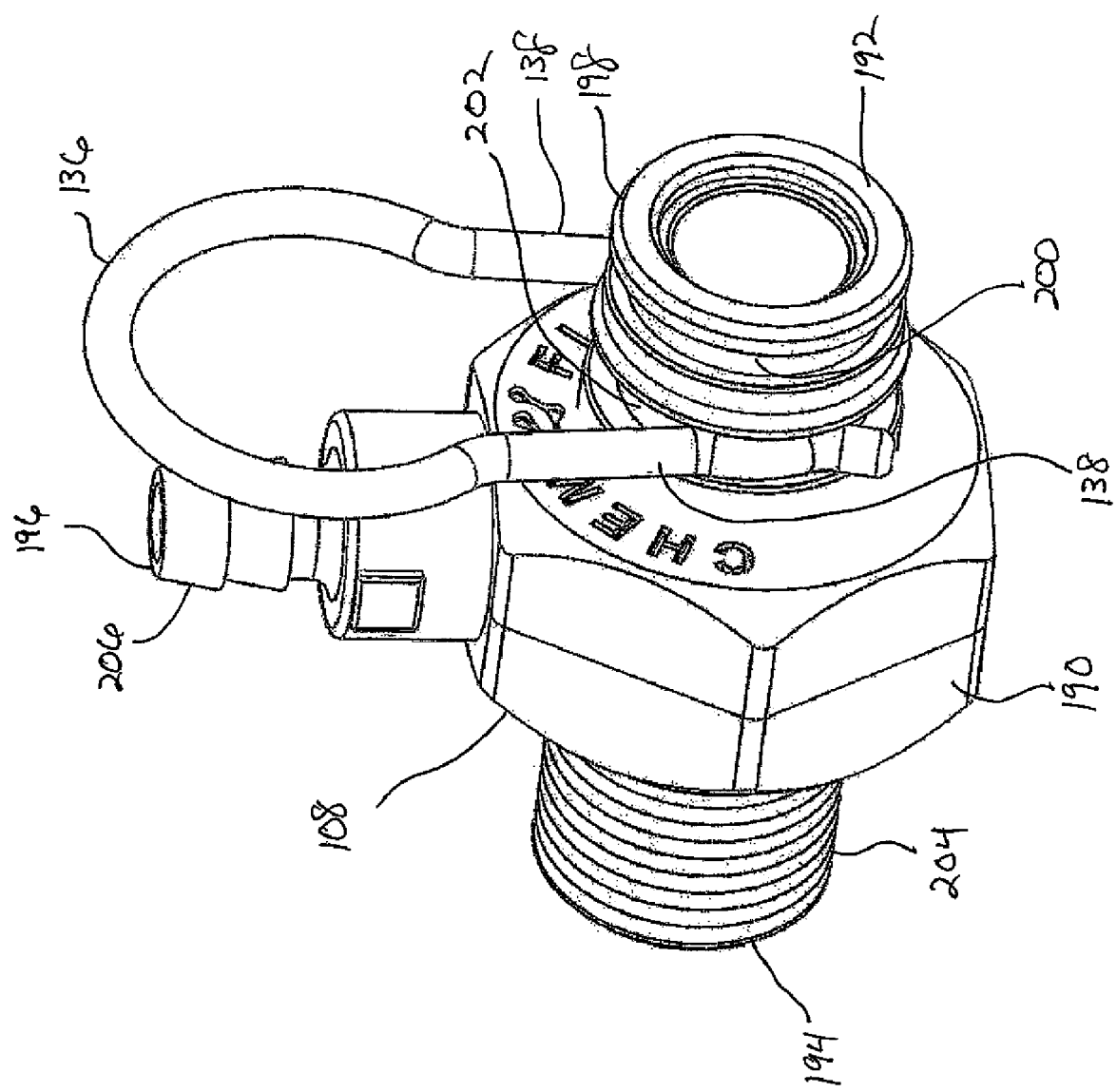
FIG. 17 is a perspective view of the eductor member of FIG. 14.

Referring now to FIGS. 11, 12, 13 as well as to FIG. 5, valve assembly 106 typically comprises an actuator portion 150 and a valve portion 152. Valve assembly 106 generally comprises any of a variety of suitable valve constructions including, for example, a cartridge-style valve having a solenoid, armature and a valve seat. In a preferred embodiment, valve assembly 106 comprises a solenoid valve assembly. Actuator portion 150 generally includes an electrical connector 154 and an enclosed electrical coil. Valve portion 152 includes a valve seat 156, a valve plunger 158, a friction ring 160, a piston 162, a spring 164 and a valve stem 166. A valve cap 168 generally comprises a cover member 170 that is positionable over the valve seat 156 to maintain the positioning of the components making up the valve portion 152 as the valve assembly 106 is attached to the manifold body 104. Cover member 170 generally comprises an internal cap thread 172 that is threadably engaged to a valve seat thread 174 as well as an external cap thread 176 that is configured to engage internal port thread 142 on the manifold body 104. Valve plunger 158 includes a projecting portion 178 and an oversized portion 180 defining a sealing flange 182. Sealing flange 182 is configured to selectively, sealingly engage a dispensing surface 184 within the valve seat 156. Valve seat 156 includes a plurality of valve inlets 186 that allow the bulk fluid from the bulk fluid flow path 118 into the dispensing fluid flow path 128.

As illustrated in FIGS. 14, 15, 16 and 17 as well as referring to FIG. 5, eductor member 108 generally comprises a molded body 190 having a dispensing inlet 192, a dispensing outlet 194 and a chemical inlet 196. In one representative embodiment, eductor member 108 can comprise an eductor assembly as disclosed and taught in United States Patent Publication No. 2006/0157131A1, which is hereby incorporated by reference. Eductor member 108 is generally sized and selected by a user based upon its capacity to deliver a specified amount of chemical into the bulk fluid for dispensing out the dispensing outlet 194. Dispensing inlet 192 is generally sized for slidable insertion within eductor port 124 and includes a tapered leading edge 198, a radial sealing groove 200 and a radial locking groove 202. Dispensing outlet 194 generally includes an outlet thread 204 that is configured for connection to a conventional tube fitting for delivering fluid to a point of use. Alternatively, dispensing outlet 194 could further comprise connection orientations such as, for example, a hose barb, a *Joint Industry Council* (JIC) fitting or a quick-release configuration similar to that employed on dispensing inlet 192. Chemical inlet 196 includes a barbed fitting 206 that is configured for attachment to conventional chemical supply tubing. Within eductor member 108, the bulk fluid enters through the dispensing inlet 192 and passes through a spray nozzle 208 entering a mixing zone 210 immediately thereafter. After the bulk fluid exits the spray nozzle 208, the bulk fluid enters the mixing zone 210 wherein educted chemical and bulk fluid combine and are then conducted out of the eductor member 108 through a divergent zone 212 downstream of the mixing zone 210. Educted chemical is fed to an eductor leg inlet passageway 214 which is comprised of an injection housing 216, a retention sleeve 218, a spring 220, a check ball 222, and a check valve o-ring 224. A vacuum created in a venturi 226 contained in the eductor body bulk fluid path educts concentrated chemical through the eductor leg inlet passageway 214. Suction from the venturi 226 overcomes spring force resulting from the spring 220 and allows concentrated chemical to flow past the check-ball 222 and into the mixing zone 210 wherein bulk fluid (typically water) and concentrated chemical are mixed.

Referring again to FIGS. 4 and 5, each eductor assembly 102 is assembled by sealingly attaching the valve assembly 106 and eductor member 108 to the manifold body 104. Generally, valve assembly 106 is attached to the valve port 126 by threadably coupling the external cap thread 176 to the internal port thread 142. To attach eductor member 108 to the manifold body 104, locking member 136 is slidably inserted into the upper locking apertures 130 such that each insertion leg 138 resides within the corresponding continuous locking bore 135. Dispensing inlet 192 is slidingly inserted into the eductor port 124 such that tapered leading edge 198 advances past the insertion legs 138 residing within locking grooves 134 such that the insertion legs 138 are captured within the radial locking groove 202. An o-ring placed within radial sealing groove 200 seals against an interior perimeter surface of the eductor port 124. Through the interaction of locking member 136 with radial locking groove 202, eductor member 108 can be quickly attached and replaced should the eductor member 108 fail during use. In addition, the radial sealing mechanism allows the molded body 190 and especially the chemical inlet 196 to be rotatably positioned so as to facilitate easy attachment of the chemical supply tubing to the barbed fitting 206 without interfering with attachment of chemical supply tubing to an adjacent eductor assembly 102.

Figure 19:
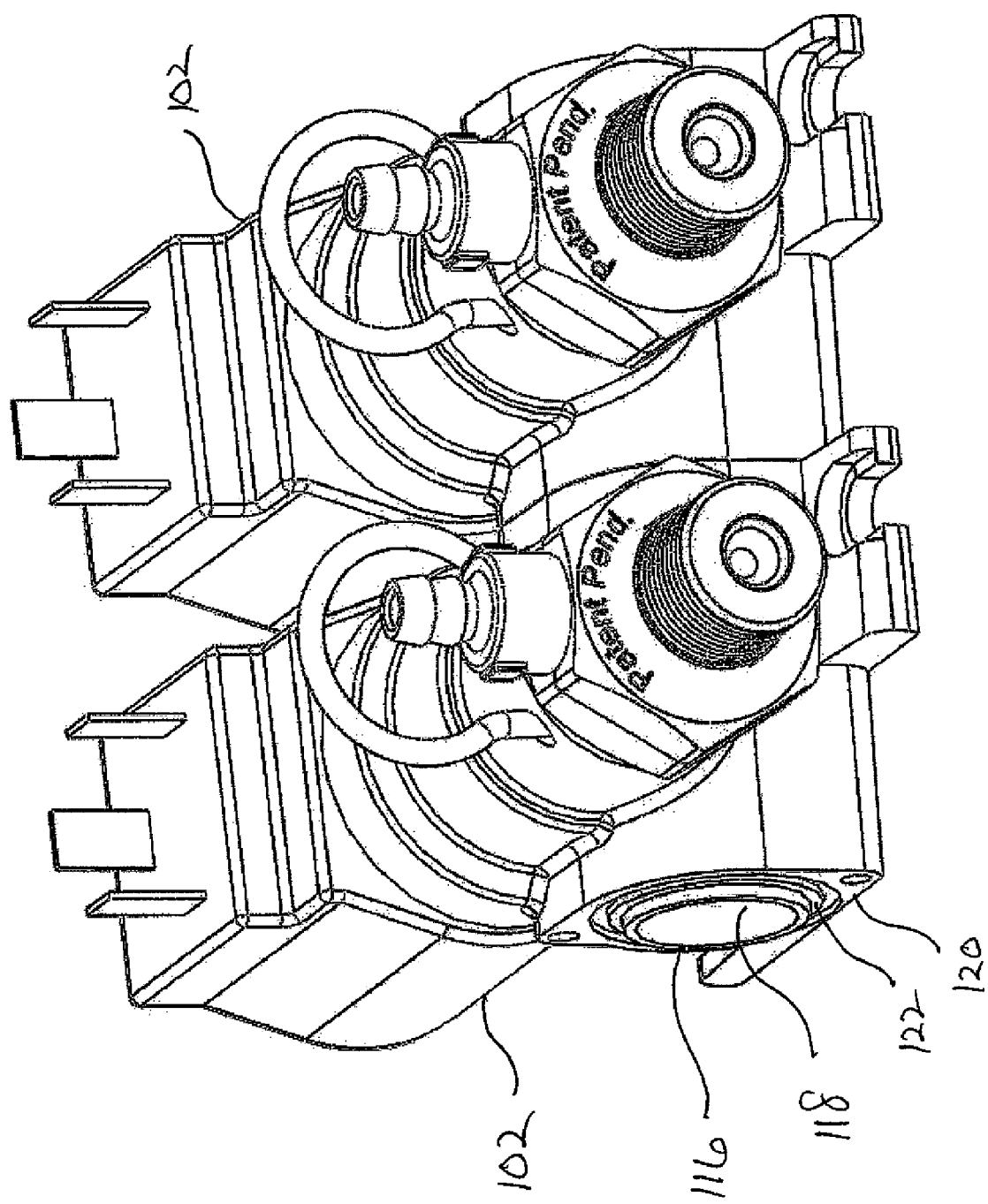
FIG. 19 is a perspective view of the first and second eductor assembly arranged in approximated relation.

With eductor assemblies 102 assembled as described, any number of eductor assemblies 102 can be arranged as shown in FIGS. 18 and 19 so as to form expandable chemical delivery system 100. As shown in FIG. 18, a pair of eductor assemblies 102 are arranged such that the bulk fluid inlet 114 of the first eductor assembly 102 is aligned with the bulk fluid outlet 116 of the second eductor assembly 102. As the aligned bulk fluid inlet 114 and bulk fluid outlet 116 are moved into physical contact, an o-ring is captured within the approximated scaling grooves 122 as the mounting faces 120 come into contact. In this manner, the bulk fluid flow paths 118 of the first and second eductor assemblies 102 are aligned so as to define a common bulk fluid flow path 118. In a similar manner, additional eductor assemblies 102 can be arranged and approximated such as, for example, the four eductor assemblies 102 shown in FIG. 20.

Figure 20:
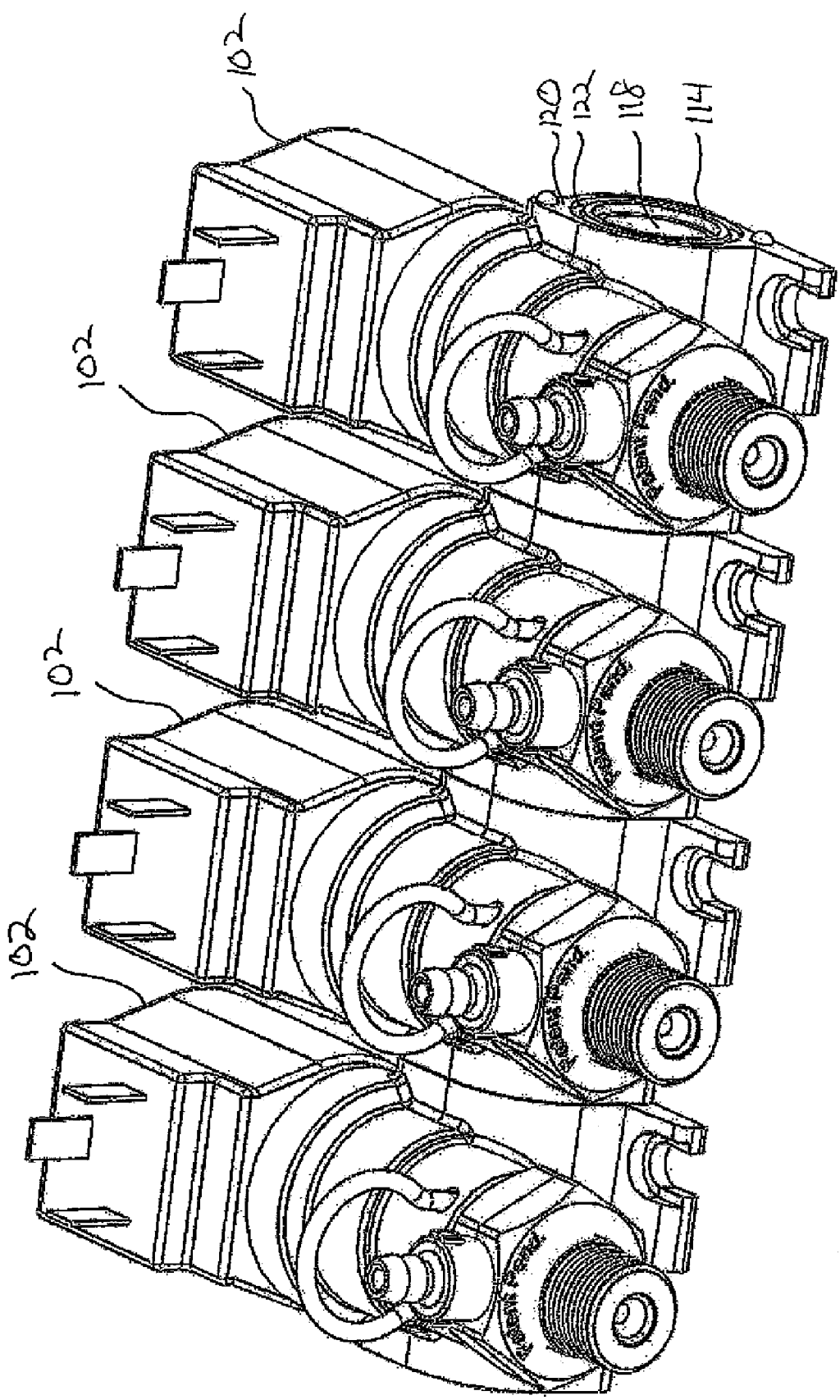
FIG. 20 is a perspective view of four eductor assemblies arranged in approximated relation.
Figure 21:
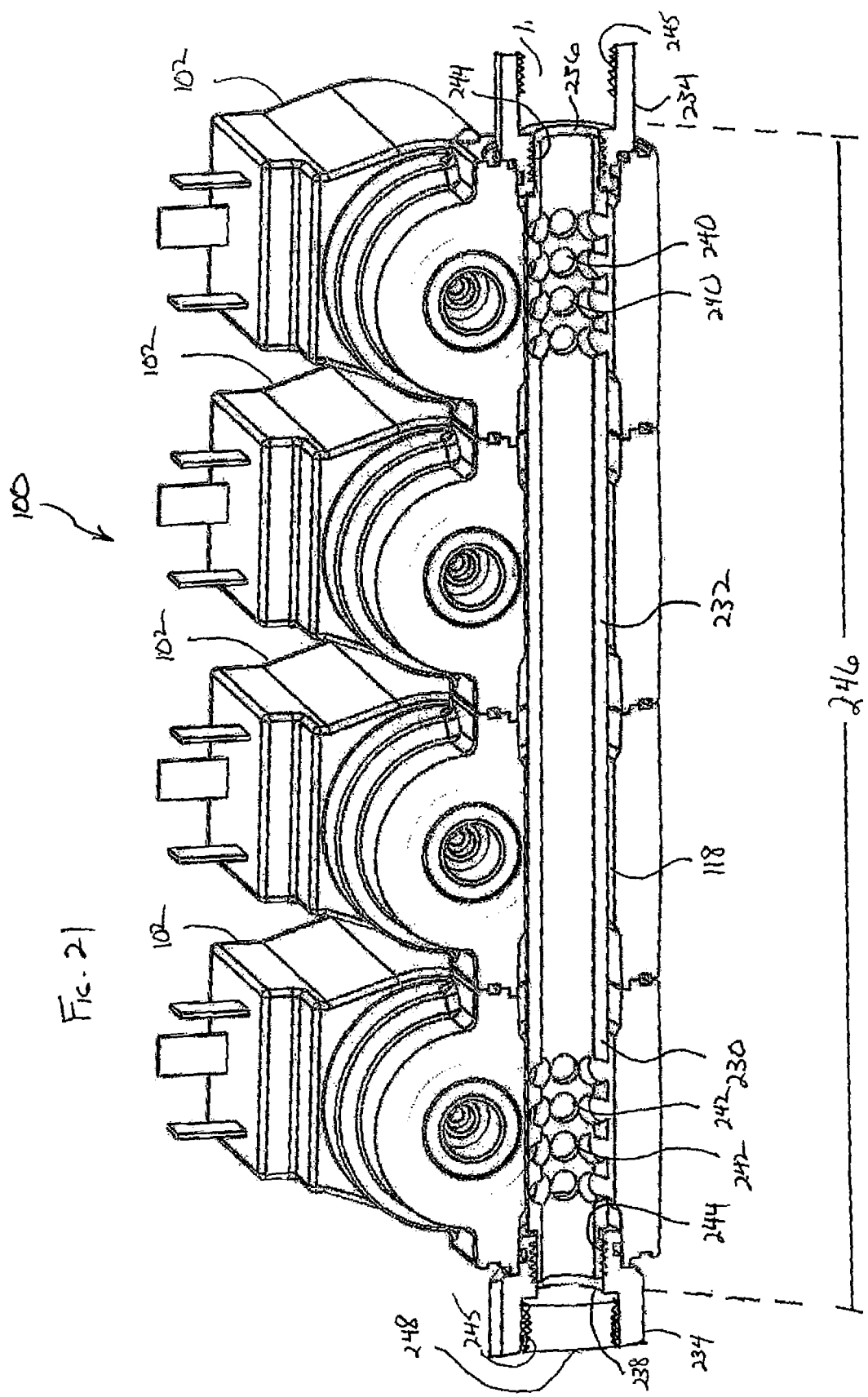
FIG. 21 is a perspective, partial section view of the expandable chemical delivery system of FIG. 1 taken at line 21-21 of FIG. 4.

With the plurality of eductor assemblies 102 arranged in approximation such as, for example, as shown in FIGS. 19 and 20, a coupling assembly 230 as shown in FIG. 21 is used to retain the eductor assemblies 102 so as to define the expandable chemical delivery system 100. Coupling assembly 230 generally comprises a coupling tube 232 and a pair of coupling nuts 234. Coupling tube 232 has a diameter smaller than the bulk fluid flow path 118 and includes a first end 236 and a second end 238. A plurality of inlet wall apertures 240 are arranged proximate the first end 236 and a plurality of outlet wall apertures 242 are located proximate the closed end 238. Alternatively, wall apertures can be positioned anywhere along the coupling tube 230 between first end 236 and second end 238. Each end of coupling tube 232 includes an external tube thread 244 and an internal tube thread 245. The coupling tube 232 is inserted through the common bulk fluid flow path 118 defined by the adjacently positioned eductor assemblies 102 such that the external tube thread 244 on the second end 238 extends from the single exposed bulk fluid outlet 116 and the external tube thread 244 on the first end 236 extends from the bulk fluid inlet 114. The coupling nuts 234 are positioned over the first end 236 and second end 238 respectively and tightened over external tube threads 244. As the coupling nuts 234 are tightened on the coupling tube 232, the eductor assemblies 102 are forcibly tightened against one another so as to form a sealed and now integral expandable chemical delivery system 100. Using the internal tube thread 245, a bulk fluid supply can be connected at the first end 236 while the internal tube thread 245 at the second end 238 can be used to connect a plumbing connector to an additional chemical delivery system 100 or alternatively, for receiving a conventional threaded plug 248 to close the second end 238. Depending upon the number of distinct chemicals and thus, the number of eductor assemblies 102 to be used in forming the expandable chemical delivery system 100, coupling tube 232 is chosen to have a selected tube length 246 corresponding to the number of eductor assemblies 102. In this manner, the chemical dispensing capacity of expandable chemical delivery system 100 can be selectively increased or decreased by adding/removing eductor assemblies 102 and selecting coupling tube 232 with the corresponding tube length 246.

In use, expandable chemical delivery system 100 is assembled based on the number of eductor assemblies 102 necessary to deliver the desired chemicals. For instance, expandable delivery system 100 can be utilized in an automated car wash using a detergent, a spot-free rinse agent and a liquid wax such that three eductor assemblies 102 are required. Based upon the cycle to be performed, a control system such as, for example, a microprocessor, Programmable Logic Controller or other known control system actuates the selected valve assembly 106 so as to allow the bulk fluid to flow from bulk fluid inlet 114, into the coupling tube 232 and out inlet wall apertures 240 and outlet wall apertures 242 such that the bulk fluid enters the bulk fluid flow path 118. With the bulk fluid present within the bulk fluid flow path 118, one or more of the valve assemblies 106 can be actuated causing valve plunger 158 to be withdrawn such that sealing flange 182 disengages from the dispensing surface 184 such that the bulk fluid enters the dispensing fluid flow path 128 through the valve inlets 186. Once the bulk fluid is flowing within the dispensing fluid flow path 128, the bulk fluid is directed through the eductor member 108 and out the dispensing outlet 194 with the desired chemical introduced through chemical inlet 196. Depending upon the process, one or more of the valve assemblies 106 can be simultaneously actuated such that introduction of the bulk fluid through the single bulk fluid inlet 114 allows a plurality of distinct mixed chemical streams to be delivered simultaneously through a plurality of dispensing outlets 194.

Figure 22:
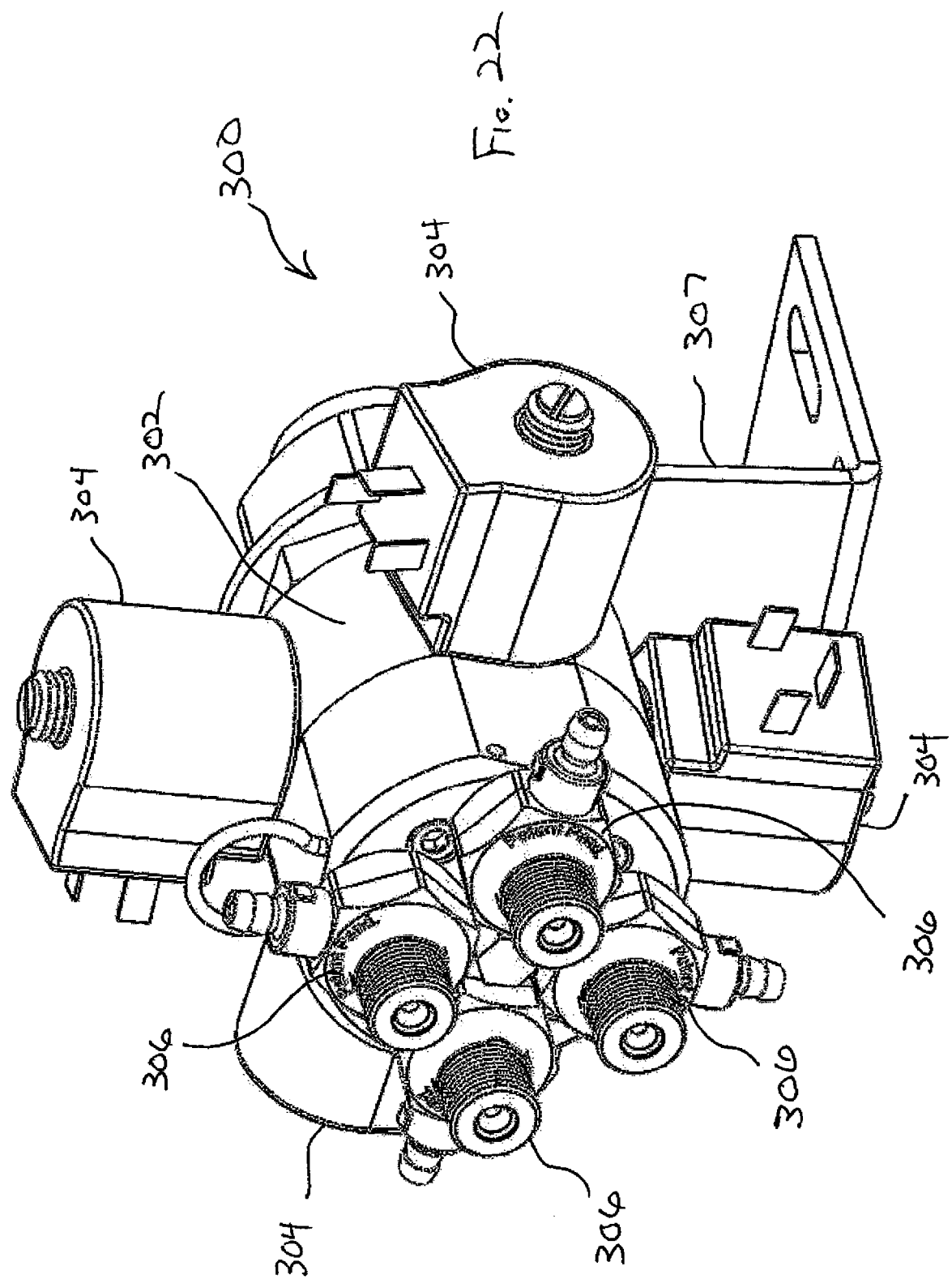
FIG. 22 is a front, perspective view of a representative embodiment of a high-pressure expandable chemical delivery system utilizing a rotary manifold body according to the present invention.
Figure 23:
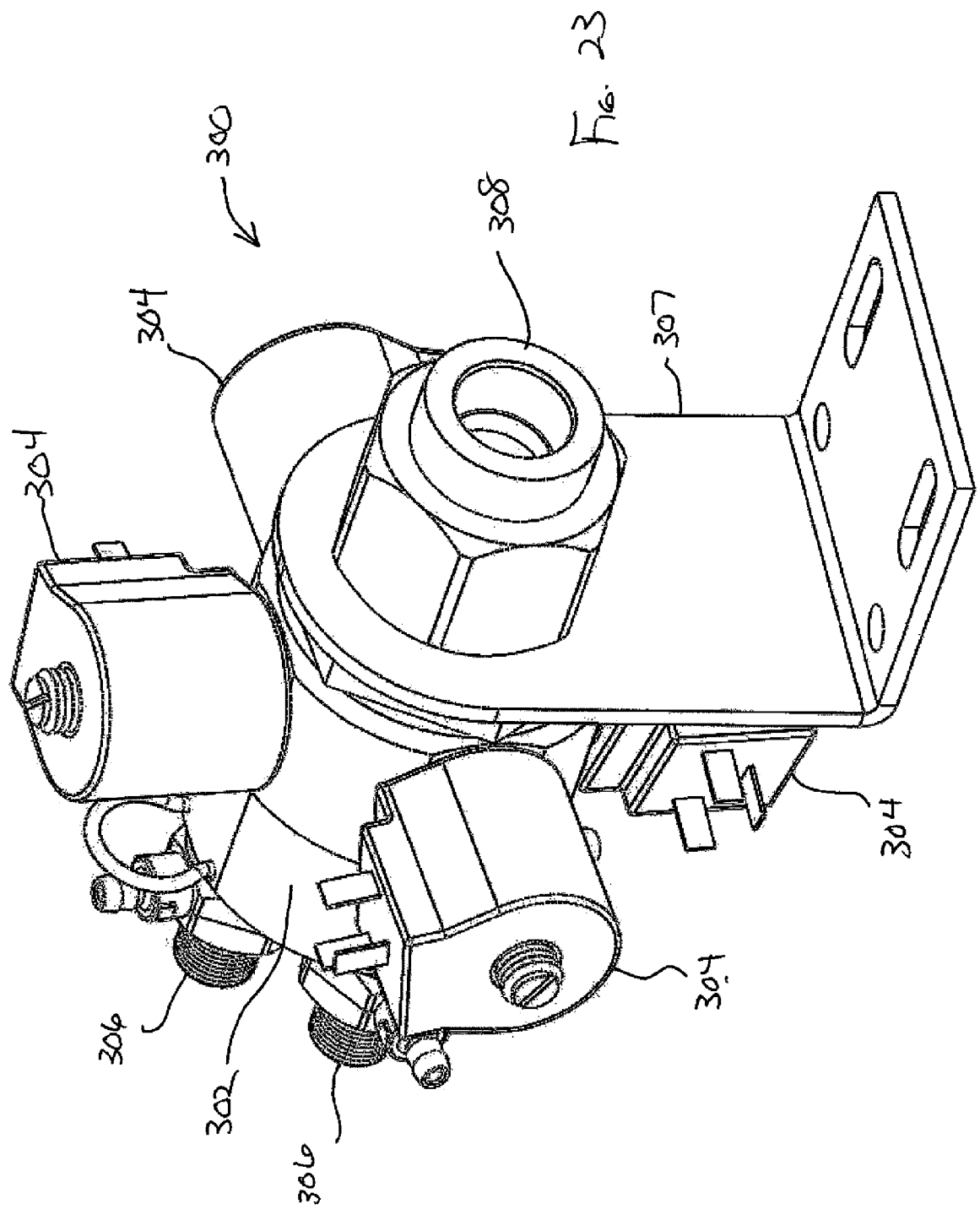
FIG. 23 is a rear, perspective view of the high-pressure expandable chemical delivery system of FIG. 22.
Figure 24:
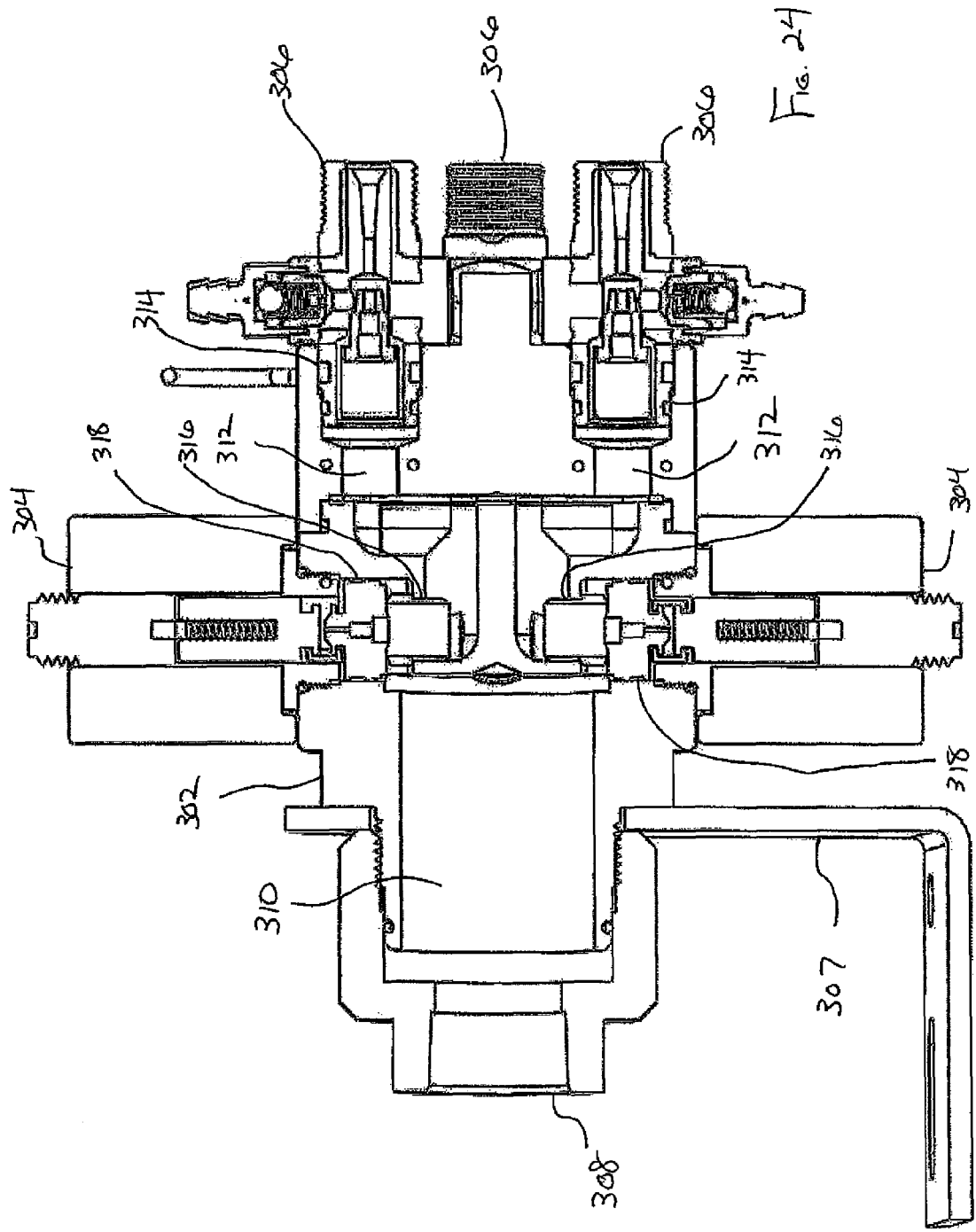
FIG. 24 is a section view of the high pressure expandable chemical delivery system of FIG. 22.
Figure 25:
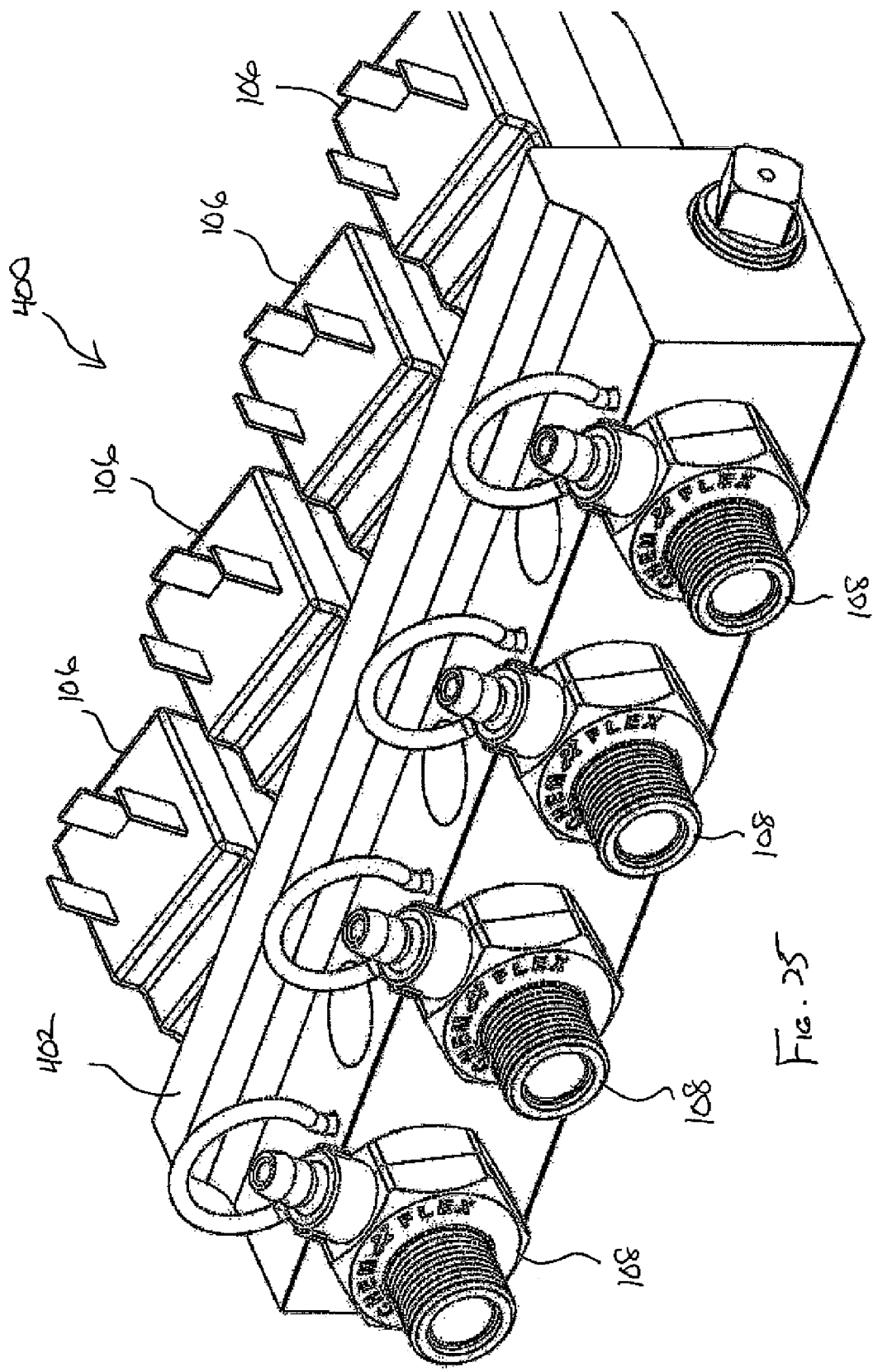
FIG. 25 is a front, perspective view of a representative embodiment of a high-pressure expandable chemical delivery system utilizing a linear manifold body according to the present invention.
Figure 26:
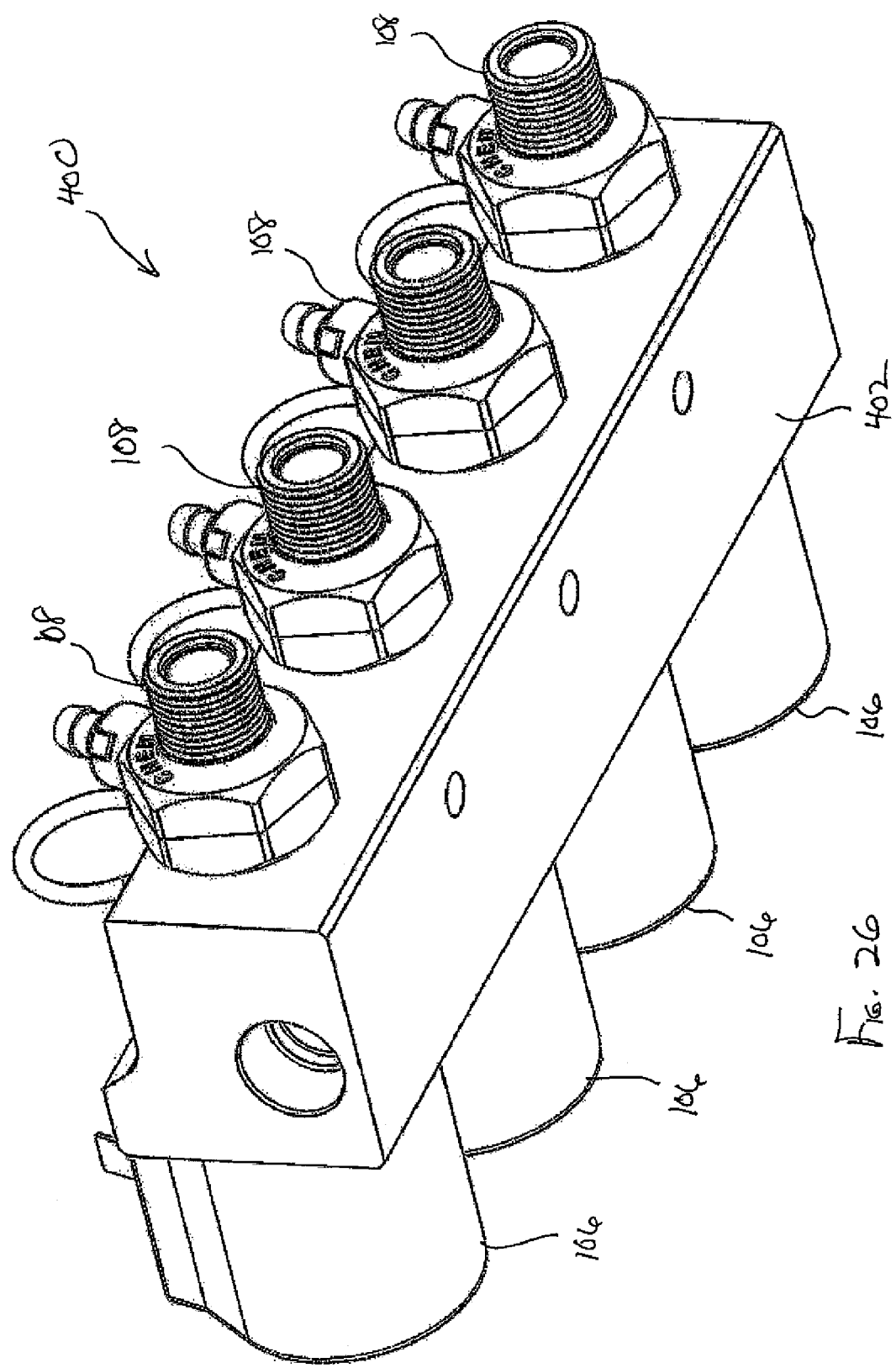
FIG. 26 is a front, perspective view of the high-pressure expandable chemical delivery system of FIG. 25.
Figure 27:
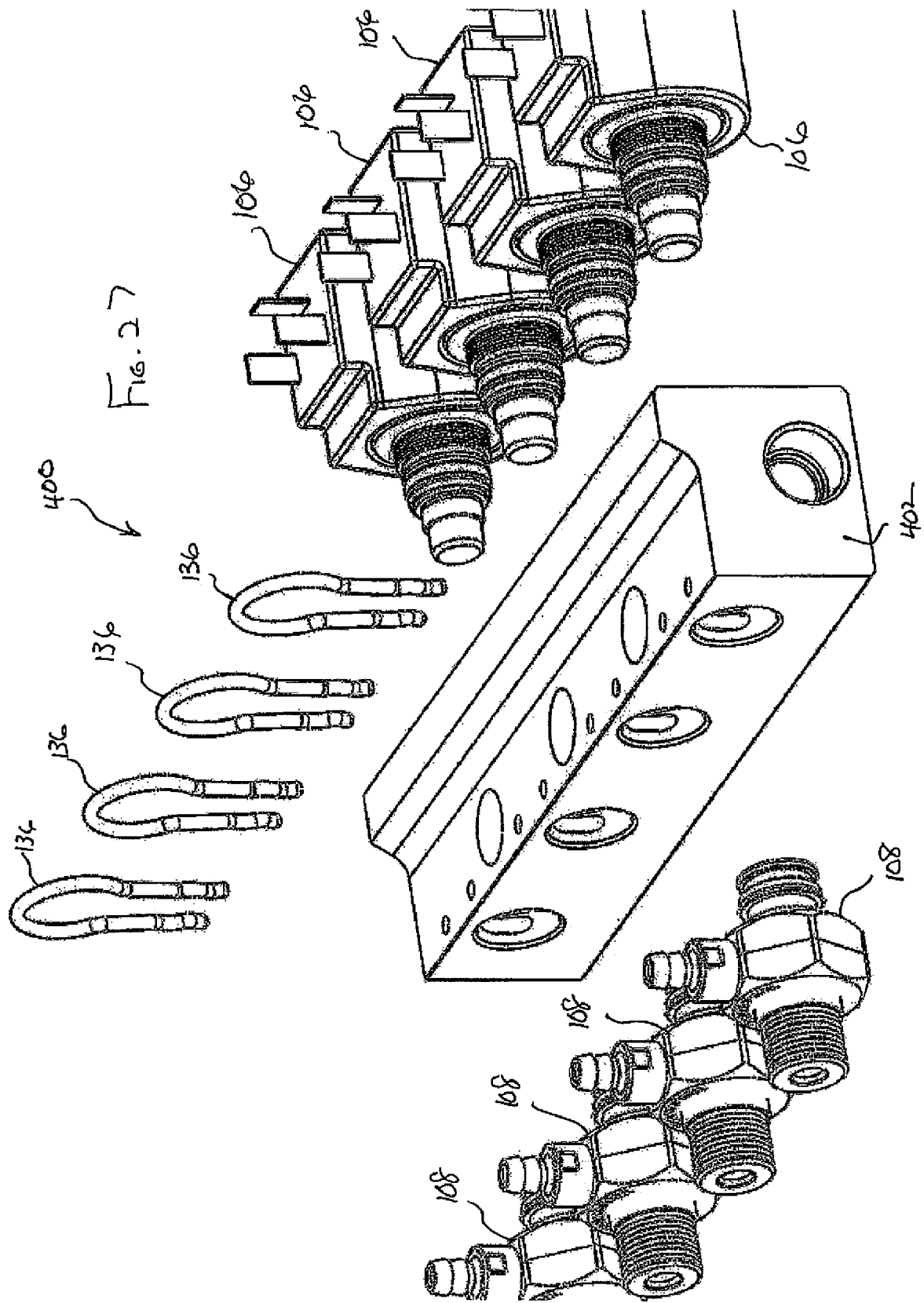
FIG. 27 is an exploded, perspective view of the high-pressure expandable chemical delivery system of FIG. 25.

Referring now to FIGS. 22, 23, 24, an alternative embodiment of a high-pressure expandable chemical delivery system 300 performs similarly to expandable chemical delivery system 100 but utilizes a single rotary manifold block 302 with a plurality of valve assemblies 304, eductor assemblies 306 and a mounting bracket 307. Rotary manifold block 302 includes a single bulk fluid inlet 308 providing bulk fluid to a bulk fluid flow conduit 310 within the rotary manifold block 302. Fluidly interconnected to the bulk fluid flow conduit 310 is a plurality of individual eductor flow conduits 312 that are fluidly connected to an eductor mounting port 314. Each eductor flow conduit 312 is intersected by a valve bore 316 arranged generally transversely to its corresponding eductor flow conduit 312. Each valve bore 316 includes a valve mounting port 318. It will be understood that manifold body 302 can be fabricated to accommodate any number of valve assemblies 304 and eductor assemblies 306 for example, four or six valve and eductor assemblies in a variety of physical arrangements. Manifold body 302 can be fabricated of suitable materials including for example, aluminum, stainless steel, titanium and the like and can include resistant coating on wetted parts to improve chemical compatibility and corrosion resistance. In some embodiments, the use of the single manifold block 302 allows the high-pressure expandable chemical delivery system 300 to accommodate bulk fluid pressure of up to 1000 psig. In some embodiments as illustrated in FIGS. 25, 26 and 27, a high pressure expanable chemical delivery system 400 can comprise a linear manifold block 402 with valve assemblies 106 and eductor members 108.

Each valve assembly 304 can substantially resemble valve assembly 106 such that valve assembly 304 is threadably mountable to the valve mounting port 316 in a manner similar to that of valve assembly 102 and valve port 126. Similarly to valve assembly 106, valve assembly 304 can comprise an actuator portion 320 and a valve portion 322 wherein the valve portion 322 includes a valve plunger 324 that is generally configured to slidably engage (closing) or disengage (opening) the eductor flow conduit 310 through the valve bore 314. Thus, a user can selectively allow bulk fluid to flow through the educator flow conduit 310 by directing the actuator portion 320 to withdraw the valve plunger 324 from the eductor flow conduit 310.

Each eductor assembly 306 can substantially resemble eductor member 108 and can mount to eductor mounting port 312 in a manner similar to eductor member 108 and eductor port 124. Each eductor port 312 includes a pair of locking apertures 330 and corresponding locking groves 332 located within the eductor port 312 to define a pair of continuous locking bores 334. Locking member 136 is again utilized to attach each eductor assembly 306 to its eductor mounting port 312 by simultaneously sliding the insertion legs 138 into the continuous locking bores 334. With the locking member 136 positioned as described, the eductor assembly 306 can be slidably inserted and captured within the eductor mounting port 312 in a similar manner as previously described with respect to the eductor member 108 and eductor port 124.

With the current design of expandable chemical delivery system 100 and high-pressure expandable chemical delivery system 300, no disconnection of bulk fluid supply piping is necessary to accomplish replacement or perform maintenance on individual eductor assemblies or valve assemblies. In addition, the mounting arrangement of the educator assembly to the manifold body for both expandable chemical delivery system 100 and high-pressure expandable chemical delivery system 300 allow an operator to rotatably manipulate the orientation and position of the eductor assembly, and more specifically, the chemical inlet based upon available space, access and ease of connection to chemical supply piping/tubing.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The invention claimed is:

1. A chemical delivery system, comprising:
    at least a pair of manifold bodies linearly arranged to share a bulk fluid inlet and defining a bulk fluid flow path, wherein the bulk fluid flow path is fluidly interconnected to a dispensing fluid flow path in each manifold body, the dispensing fluid flow path defined between an eductor port and a valve port, the manifold bodies being fixedly coupled with a coupling tube that extends fully through the bulk fluid flow path, the coupling tube having a first end and a second end, wherein the first and second end each include an external tube thread such that tightening a coupling nut over the external tube thread at each of the first and second ends causes the manifold bodies to be sealing engaged, and wherein the coupling tube includes an internal tube thread at the first end for attaching a bulk fluid supply such that the bulk fluid supply enters the coupling tube and is directed into the bulk fluid flow path through a plurality of wall apertures in the coupling tube; and
    at least a pair of eductor assemblies, each eductor assembly including an eductor member and a valve assembly, the eductor member and valve assembly operably connected to the corresponding valve port and eductor port, each eductor member including a chemical inlet and a dispensing outlet wherein the valve assembly selectively directs the bulk fluid into the dispensing fluid flow path for drawing a chemical through the chemical inlet for mixing with the bulk fluid and dispensing through to a point of use through the dispensing outlet.

2. The chemical delivery system of claim 1, wherein each eductor port includes a pair of locking bores for slidably receiving a locking member, the locking member adapted to fixedly retain a dispensing inlet on each eductor member.

3. The chemical delivery system of claim 2, wherein the eductor member is rotatably positionable within the eductor port so as to rotatably orient the chemical inlet on the eductor member in a desired connection orientation.

4. The chemical delivery system of claim 2, wherein the dispensing inlet includes a tapered leading edge and a radial locking groove, the tapered leading edge being directed through and past the locking member such that the locking member snaps into the radial locking groove.

5. The chemical delivery system of claim 4, wherein the dispensing inlet includes a radial sealing mechanism so as to seal the dispensing inlet within the eductor port when the locking member is retained within the radial locking groove.

6. The chemical delivery system of claim 1, wherein the valve assembly comprises a solenoid valve assembly.

7. A method for dispensing a chemical to point of use, comprising:
    arranging at least a pair of manifold bodies to share a bulk fluid inlet and define a bulk fluid flow path;
    coupling the pair of manifold bodies with a coupling tube inserted through the bulk fluid flow path, the coupling tube including an external tube thread on both first and second ends of the coupling tube such that a coupling nut is tightened over the external tube thread on each end of the coupling tube;
    mounting an eductor member to an eductor port on each manifold body;
    mounting a valve assembly to a valve port on each manifold body;
    attaching a bulk fluid supply to an internal tube thread at the first end of coupling tube;
    directing the bulk fluid supply out a plurality of wall apertures in the coupling tube such that the bulk fluid supply enters the bulk fluid flow path;
    selectively opening the valve assemblies to selectively allow the bulk fluid to enter a dispensing flow path defined between the eductor port and the valve port in each manifold body such that the bulk fluid mixes with a chemical in the eductor member; and
    dispensing a mixed fluid to point of use through a dispensing outlet of the eductor member.

8. The method of claim 7, wherein mounting the eductor member to the eductor port on each manifold body, further comprises:
    advancing a tapered leading edge of the eductor member into the eductor port such that the tapered leading edge is directed past a locking member which snaps into a radial locking groove on the tapered leading edge.

9. The method of claim 8, further comprising:
    rotating the eductor member within the eductor port to orient a chemical inlet relative to an adjacent eductor member.

* * * * *